(12) United States Patent
Morishita

(10) Patent No.: US 12,026,737 B2
(45) Date of Patent: Jul. 2, 2024

(54) MANAGEMENT SYSTEM, MANAGEMENT METHOD, MANAGEMENT SERVER, AND STORAGE MEDIUM

(71) Applicant: HONDA MOTOR CO., LTD., Tokyo (JP)

(72) Inventor: Hidekazu Morishita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/170,706

(22) Filed: Feb. 17, 2023

(65) Prior Publication Data

US 2023/0274303 A1 Aug. 31, 2023

(30) Foreign Application Priority Data

Feb. 28, 2022 (JP) ................................. 2022-029245

(51) Int. Cl.
*G06Q 30/02* (2023.01)
*G06Q 30/0207* (2023.01)
*G06Q 30/0645* (2023.01)

(52) U.S. Cl.
CPC ..... *G06Q 30/0209* (2013.01); *G06Q 30/0645* (2013.01)

(58) Field of Classification Search
CPC ........... G06Q 30/0209; G06Q 30/0645; G06Q 30/02; G06Q 30/0208; G06Q 30/06; G06Q 50/06; G06Q 30/0207–30/0277
See application file for complete search history.

(56) References Cited

U.S. PATENT DOCUMENTS

| | | | | |
|---|---|---|---|---|
| 10,650,444 | B2 * | 5/2020 | Takatsuka | B60L 50/60 |
| 10,846,786 | B2 * | 11/2020 | Iwai | G07F 17/0057 |
| 11,010,824 | B2 * | 5/2021 | Takatsuka | H01M 10/42 |
| 11,397,998 | B2 * | 7/2022 | Lin | B60L 58/12 |
| 11,615,409 | B1 * | 3/2023 | Rehm | H04L 9/3213 705/71 |
| 2019/0172083 | A1 * | 6/2019 | Igata | G06Q 30/0206 |
| 2019/0197608 | A1 * | 6/2019 | Iwai | G06Q 30/0645 |
| 2020/0231064 | A1 * | 7/2020 | Zhao | B60L 50/64 |
| 2020/0403419 | A1 * | 12/2020 | Yokoyama | G06Q 50/30 |
| 2020/0408807 | A1 * | 12/2020 | Oshima | G06Q 30/02 |
| 2021/0004848 | A1 * | 1/2021 | Nakajima | B60L 58/16 |
| 2022/0114610 | A1 * | 4/2022 | Miyata | B60L 53/665 |
| 2022/0318865 | A1 * | 10/2022 | Watanabe | G06Q 30/04 |

(Continued)

FOREIGN PATENT DOCUMENTS

JP 6882588 B1 6/2021

*Primary Examiner* — Thuy N Nguyen
(74) *Attorney, Agent, or Firm* — Rankin, Hill & Clark LLP

(57) ABSTRACT

A management server includes: a reception section that receives, from a second user terminal, a rental request for use of a battery; and an incentive management section that, when a first battery or a second battery is rented to a second user, gives an incentive, according to return of the battery from the second user, wherein the incentive management section gives a first incentive to the second user when the second user returns the first battery to a first user, and gives a second incentive to the second user when the second user returns the second battery to the first user or when the second user returns the first battery to a place of return that is different from the first user, and the first incentive is an incentive having a higher value than the second incentive.

13 Claims, 16 Drawing Sheets

(56) References Cited

U.S. PATENT DOCUMENTS

| | | | |
|---|---|---|---|
| 2023/0045756 A1* | 2/2023 | Hung | H02J 7/0068 |
| 2023/0059968 A1* | 2/2023 | Toya | H02J 7/0042 |
| 2023/0204375 A1* | 6/2023 | Nakamura | G01C 21/3679 |
| | | | 701/425 |
| 2023/0289871 A1* | 9/2023 | Igata | G07F 15/005 |
| | | | 705/307 |

* cited by examiner

MANAGEMENT SYSTEM, MANAGEMENT METHOD, MANAGEMENT SERVER, AND STORAGE MEDIUM

INCORPORATION BY REFERENCE

The present application claims priority under 35 U.S.C. § 119 to Japanese Patent Application No. 2022-029245 filed on Feb. 28, 2022. The content of the application is incorporated herein by reference in its entirety.

BACKGROUND OF THE INVENTION

Field of the Invention

The present invention relates to a management system, a management method, a management server, and a storage medium.

Description of the Related Art

In recent years, renewable energy has attracted growing attention in order to reduce $CO_2$ emissions, with a view to restraining climate-related disasters. Against such a backdrop, use of chargeable batteries such as a lithium-ion secondary battery is increasing, for a technique of making it possible to use electricity generated by renewable energy at places other than a place where the electricity is generated. It has been proposed to use a battery for a power source for a vehicle. As an example, as in Japanese Patent No. 6882588, an electrified vehicle has been known that includes a main-body battery attached to a vehicle body, and a drive source that outputs driving force for traveling by using electricity from the main-body battery, wherein a holder is provided to the vehicle body, the holder removably holding a user battery owned by a user, apart from the main-body battery, and the holder including a function of charging the user battery.

Among conventional techniques, a rental system is conceivable in which a user owning a user battery (hereinafter, referred to as "lessor") rents out to a third-party user (hereinafter, referred to as "lessee"). In such a type of system, user convenience increases as a user has higher degrees of freedom with respect to a counter-party to a rental transaction, and a timing and a place of rental. On the other hand, when a user frequently uses a specific battery, it is presumed that psychological benefits are brought about, such as the user having confidence in a state of the battery, and the user developing affection for the battery.

An object of the present invention is to provide a management system, a management method, a management server, and a storage medium that allow a user to use a specific battery with a high frequency or for a long time, without impairing user convenience with respect to battery rental between users.

SUMMARY OF THE INVENTION

One aspect of the present invention is a management system including: a plurality of portable batteries including a first battery and a second battery, the first battery being associated with a first user, the second battery being not associated with the first user; a management server that manages information related to use of the batteries; first user terminal used by the first user; and a second user terminal used by a second user, wherein the management server includes a reception section that receives, from the second user terminal, a rental request for use of the first battery or the second battery, and an incentive management section that, when the first battery or the second battery is rented to the second user, gives an incentive to the second user, according to return of the first battery or the second battery from the second user, the incentive management section gives a first incentive to the second user when the second user returns the first battery to the first user, and gives a second incentive to the second user when the second user returns the second battery to the first user or when the second user returns the first battery to a place of return that is different from the first user, and the first incentive is an incentive having a higher value than the second incentive.

According to the one aspect of the present invention, battery rental between users can be made easier. Moreover, the second user who has rented the battery associated with the first user can be encouraged to return the battery to the first user, without impairing convenience of the second user. Thus, high-frequency use or long-time use of a specific battery by a user is promoted. Accordingly, it can be expected that the user develops confidence in and affection for the battery.

DETAILED DESCRIPTION OF THE PREFERRED EMBODIMENTS

1. Configuration of Rental System

Figure 1:
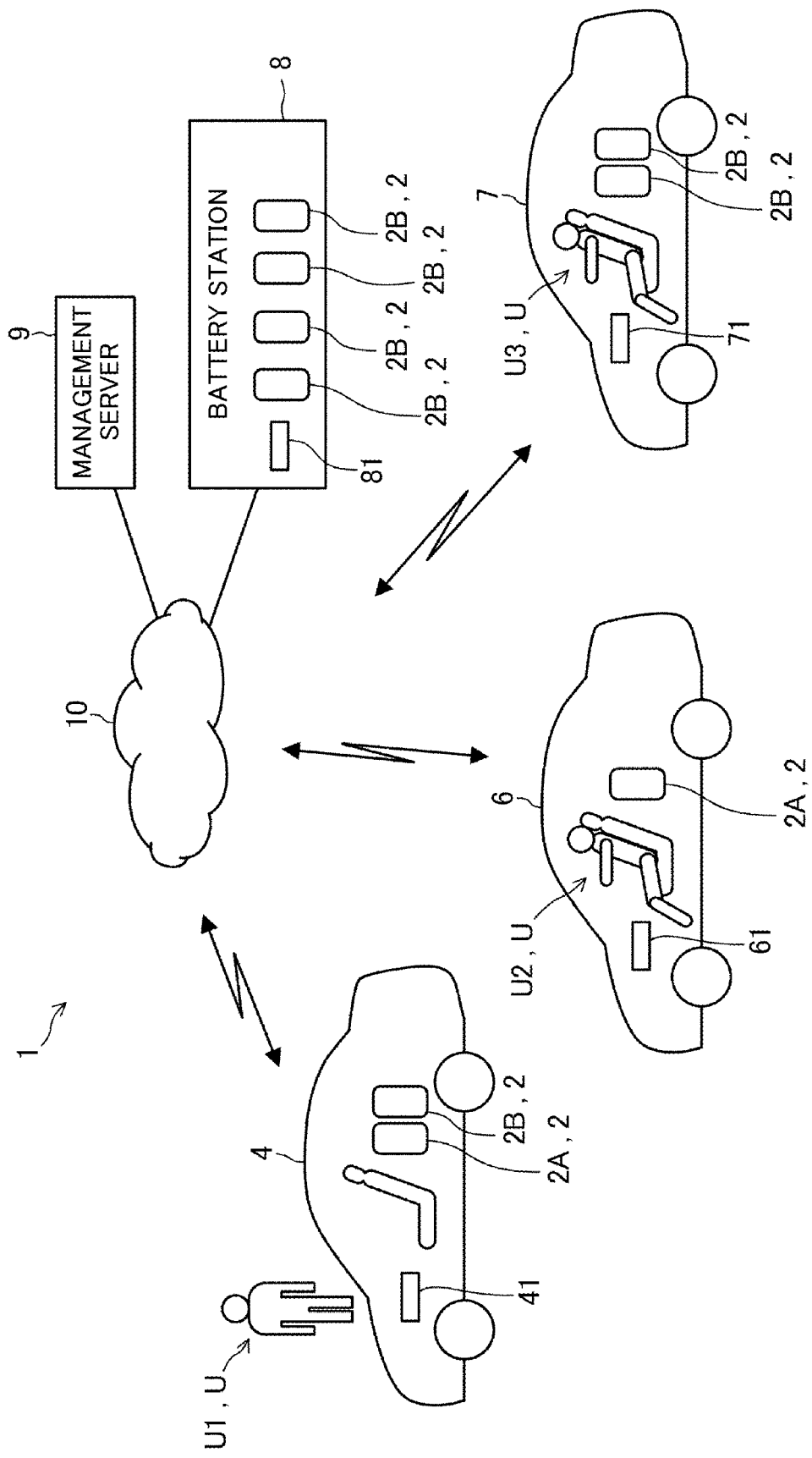
FIG. 1 shows a configuration of a rental system.

FIG. 1 shows a configuration of a rental system 1 according to an embodiment.

The rental system 1 is a system that provides users U with a service for rental of a power pack 2, which is a mobile battery, between the users U. The power pack 2 corresponds to an example of a battery in the present disclosure. The rental system 1 corresponds to an example of a management system.

In the present embodiment, users U1, U2, U3 are illustrated as users U using the rental system 1, and are denoted as a user U when not distinguished from each other. The rental system 1 in the present embodiment, as shown in FIG. 1, includes a first vehicle 4 operated by the user U1, a second vehicle 6 operated by the user U2, a third vehicle 7 operated by the user U3, a battery station 8, and a management server 9. The number of users U covered by the service of the rental system 1, and the number of vehicles included in the rental system 1 are not limited. The configuration in FIG. 1 including three users U and three vehicles corresponds to an example of the configuration of the rental system 1.

The first vehicle 4 is an electrified four-wheeled automobile, and includes a first communication device 41. Similarly, the second vehicle 6 and the third vehicle 7 are electrified four-wheeled automobiles. The second vehicle 6 includes a third communication device 61, and the third vehicle 7 includes a fifth communication device 71. The first vehicle 4 corresponds to an example of a first mobile object.

The battery station 8 is a device that can accommodate a plurality of power packs 2. The battery station 8 has such a configuration that allows a user U to put a power pack 2 in the battery station 8, and allows a user U to take a power pack 2 out of the battery station 8. In other words, by operating the battery station 8, a user U can rent a power pack 2 from the battery station 8 and can return the power pack 2 to the battery station 8. The battery station 8 is, for example, a device managed by a provider of the rental system 1.

The battery station 8 not only can accommodate a power pack 2, but also can charge the accommodated power pack 2, which will be described later. For example, the battery station 8 is installed at a dealer that sells vehicles such as the first vehicle 4, the second vehicle 6, and the third vehicle 7. The battery station 8 may be installed at a maintenance service station that provides maintenance for vehicles, or a shop running a business irrelevant to vehicles, such as a convenience store. The battery station 8 may be installed in a parking lot or on a road.

The battery station 8 corresponds to an example of a battery accommodation device in the present invention.

A communication network 10 is a communication circuit network including the Internet and the like. The first communication device 41 is a device including a transmitter that transmits data to and a receiver that receives data from the management server 9 via the communication network 10, and performs wireless communication by using a cellular communication system such as 3G (third-generation mobile communication system), 4G (fourth-generation mobile communication system), LTE (Long Term Evolution), or 5G (fifth-generation mobile communication system). The third communication device 61 is a device including a transmitter that transmits data to and a receiver that receives data from the management server 9 via the communication network 10, and performs wireless communication by using a cellular communication system. The fifth communication device 71 is a device including a transmitter that transmits data to and a receiver that receives data from the management server 9 via the communication network 10, and performs wireless communication by using a cellular communication system.

With such configurations, each of the first vehicle 4, the second vehicle 6, the third vehicle 7, and the battery station 8 performs data communication mutually with the rental system 1 via the communication network 10.

The first vehicle 4 transmits information to and receives information from the management server 9 by using the first communication device 41. Examples of the information received by the first communication device 41 include image data such as a character image 101 and a map image 102, which will be described later. The first vehicle 4 displays an image or a letter, based on the information received by the first communication device 41. Similarly, the second vehicle 6 transmits information to and receives information from the management server 9 by using the third communication device 61, and the third vehicle 7 transmits information to and receives information from the management server 9 by using the fifth communication device 71. The battery station 8 transmits information to the management server 9 by using a seventh communication device 81.

For example, the first vehicle 4 may be configured to be capable of wirelessly communicating with a terminal device such as a smartphone used by the user U1. Specifically, the first vehicle 4 may include a communication device that is a device having a shorter communication range than the first communication device 41, and that includes a transmitter transmitting data to and a receiver receiving data from the smartphone. As an illustration, the communication device may be configured to perform wireless communication by using a communication system such Wi-Fi®. The same applies to the second vehicle 6 and the third vehicle 7.

A power pack 2 can be disposed at a predetermined place in the first vehicle 4. Examples of the predetermined place include under a seat and in a trunk. Similarly, a power pack 2 can be disposed at a predetermined place also in the second vehicle 6 and the third vehicle 7.

The first vehicle 4 includes a charge station 44 that charges a power pack 2, which will be described later. Similarly, the second vehicle 6 includes a charge station 64 that charges a power pack 2, and the third vehicle 7 includes a charge station 74. As described above, a power pack 2 can be disposed in the first vehicle 4, the second vehicle 6, and the third vehicle 7, and can be charged in a state of being disposed in the vehicles.

The power pack 2 mounted in the charge station 44 of the first vehicle 4 can be said to be a power pack 2 associated with the user U1. Similarly, the power pack 2 mounted in the charge station 64 of the second vehicle 6 can be said to be a power pack 2 associated with the user U2. The power pack 2 mounted in the charge station 74 of the third vehicle 7 can be said to be a power pack 2 associated with the user U3.

Each power pack 2 includes a wireless communication device conforming to a short-range wireless communication standard such as Bluetooth®. Each power pack 2 transmits battery state information indicating a state of the power pack 2 and a battery ID (identification) uniquely specifying the power pack 2 to an external device through wireless communication. Note that each power pack 2 only needs to be capable of being charged and discharged repeatedly by incorporating a secondary battery. For such chargeable power packs 2, a type of a storage battery, a material of an electrode, a material of an electrolyte, a battery capacity, a shape of the power pack 2, and the like are not limited. The ID of a power pack 2, that is, the battery ID corresponds to an example of battery identification information.

A user U who owns or uses a power pack 2 can be a lessor who rents the power pack 2 out. The lessor, who rents a power pack 2 out, refers to a person entitled to rent a power pack 2 out to a third party, and is, for example, an owner of the power pack 2, or a person entitled to sublease the power pack 2 rented from the provider of the rental system 1 or the like.

Moreover, any one of the users U1, U2, U3 can be a lessee who rents a power pack 2. The lessee, who rents a power pack 2, can rent a power pack 2 from a lessor. For example, a lessee of a power pack 2 is a user U registered beforehand with the rental system 1, as a person who can pay money in consideration of rental of the power pack 2 and to whom an incentive can be provided.

Hereinafter, as an example of operation in the rental system 1, a description is given of operation in a case where the user U1 is a lessor who rents a power pack 2 out, and the user U2 is a lessee who rents the power pack 2. The user U1 has a right to use the power pack 2 or ownership thereof. Similarly, the users U2, U3 also have a right to use a power pack 2 or ownership thereof. Any of the users U1, U2, U3 correspond to examples of a first user and a second user in the present invention.

The management server 9 is a server computer that provides the above-described rental service, and manages information related to rental of a power pack 2.

Each of the first vehicle 4, the second vehicle 6, and the third vehicle 7 includes a device corresponding to a client that performs processing related to rental of a power pack 2 in correspondence with the management server 9. Specifically, the devices are a vehicle control device 40, a vehicle control device 60, and a vehicle control device 70, which will be describe later. The vehicle control device 40, the vehicle control device 60, and the vehicle control device 70 correspond to examples of a user terminal in the present invention. When the user U1 corresponds to the first user in the present disclosure and the user U2 corresponds to the second user in the present disclosure, the vehicle control device 40 corresponds to an example of a first user terminal, and the vehicle control device 60 corresponds to an example of a second user terminal. In such a case, the first vehicle 4 corresponds to an example of the first mobile object.

Here, the rental service of the rental system 1 in the present embodiment is premised on the following first to tenth matters.

The first matter is that a lessor of a power pack 2 rents the power pack 2 out, at a current position of the first vehicle 4 as a place of rental.

The second matter is that when a lessee rents a power pack 2, the lessee can exchange the power pack 2 to rent with a power pack 2 that the lessee is currently using. Such a manner is called an exchange system.

The third matter is that a lessee can rent a power pack 2 even if the lessee does not exchange the power pack 2 to rent with a power pack 2 that the lessee is currently using.

The fourth matter is that a lessee can rent a power pack 2 even if the lessee does not own a power pack 2.

The fifth matter is that when power packs 2 are exchanged by a lessee, a lessor can rent out the power pack 2 acquired from the lessee through exchange. In other words, the lessor is entitled to sublease the power pack 2 acquired through exchange.

The sixth matter is that a lessor of a power pack 2 receives an incentive according to a record of renting the power pack 2 out, from the provider of the rental system 1 or the like.

The seventh matter is that a lessee of a power pack 2, when returning the power pack 2, may receive an incentive from the provider of the rental system 1 or the like.

The eighth matter is that a lessee of a power pack 2 can return the rented power pack 2 to the battery station 8.

The ninth matter is that an incentive received by a lessee differs depending on whether a place of return to which the lessee returns a power pack 2 is a lessor or the battery station 8.

The tenth matter is that a lessor can use a power pack 2 placed in the battery station 8, from the battery station 8.

According to the rental system 1, a lessor of a power pack 2 can rent the power pack 2 out, not only from a home of the lessor, but also at a destination of going-out to which the lessor moves by vehicle. Here, examples of the destination of going-out include places that can be used by many and unspecified people, such as a shopping mall and a public facility. Moreover, the lessor can receive an incentive for renting-out of the power pack 2. On the other hand, a lessee can rent a power pack 2 from a lessor or the battery station 8 in cases such as where remaining electricity stored in a currently used power pack 2 becomes very little, and where the lessee wants to use a power pack 2.

A configuration of each part of the rental system 1 is described.

Figure 2:
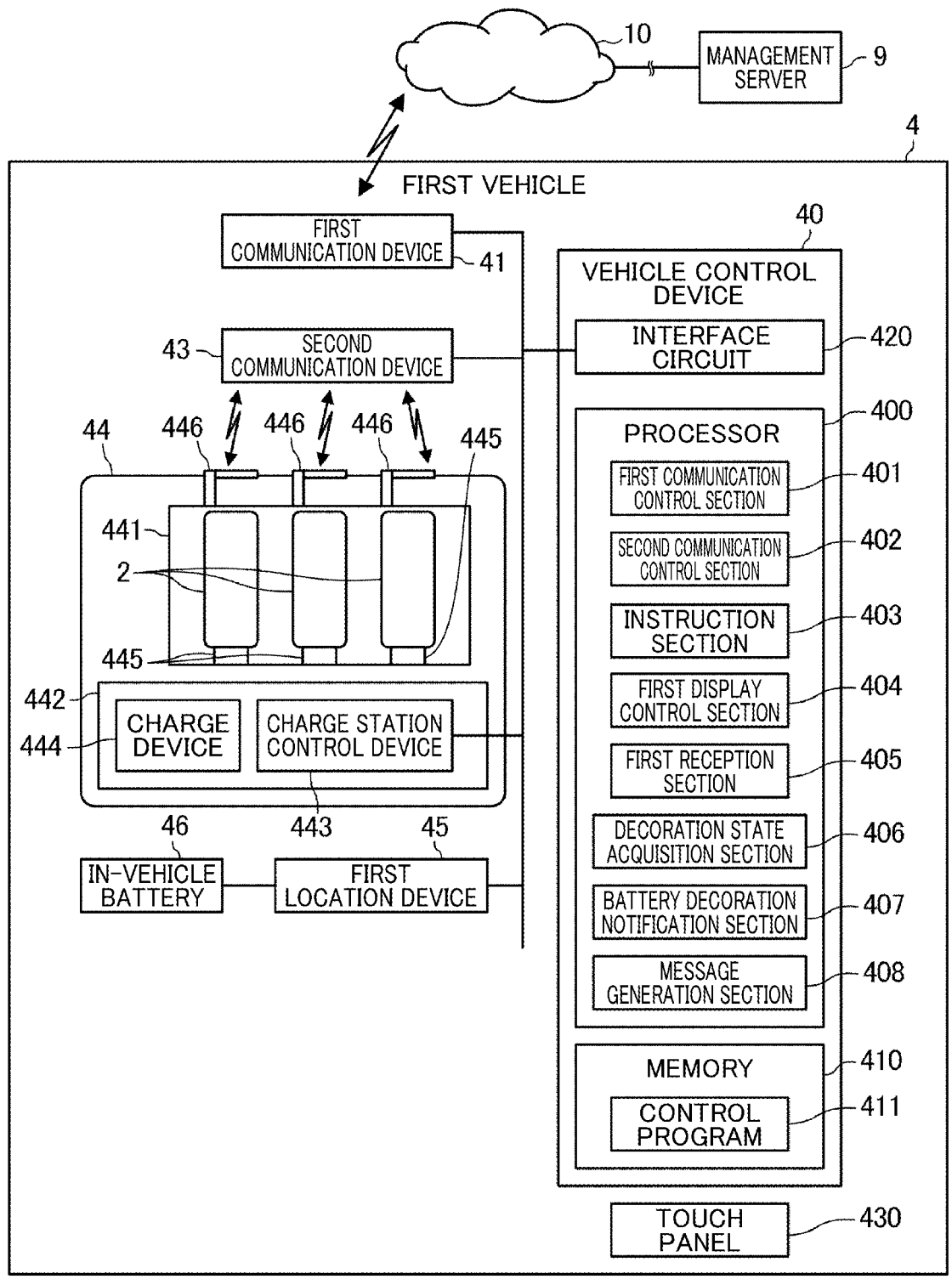
FIG. 2 shows a configuration of a first vehicle.

FIG. 2 shows a configuration of the first vehicle 4.

2. Configuration of First Vehicle

First, the configuration of the first vehicle 4 is described.

The first vehicle 4 includes the vehicle control device 40, the first communication device 41, a second communication device 42, the charge station 44, and a first location device 45.

The second communication device 42 is a device having a shorter communication range than the first communication device 41, and is a device including a transmitter that transmits data to and a receiver that receives data from a power pack 2 set in the first vehicle 4. The second communication device 42 performs wireless communication by using a communication system such as Bluetooth.

The vehicle control device 40 is a device that controls each part of the first vehicle 4. The vehicle control device 40 includes a processor 400 such as a CPU (central processing unit) or an MPU (micro-processing unit), a memory 410, an interface circuit 420 to which another device and sensors are connected, and a touch panel 430.

The memory 410 is a storage device (storage medium) that stores a program to be executed by the processor 400 and data in a nonvolatile manner. The memory 410 is configured by using a magnetic storage device, a semiconductor storage element such as a flash ROM (read only memory), or another type of nonvolatile storage device. The memory 410 may include a RAM (random access memory) on which a work area for the processor 400 is configured. The memory 410 may include a nonvolatile storage device such as an HDD (hard disk drive) or an SSD (solid state drive). The memory 410 stores data to be processed by the processor 400 and a control program 411 to be executed by the processor 400.

The touch panel 430 has a configuration in which a liquid crystal display panel that displays letters and images, and a touch sensor that senses contact with the liquid crystal display panel are superposed.

The first communication device 41, the second communication device 42, the charge station 44, and the first location device 45 are connected to the vehicle control device 40.

The charge station 44 includes a holding unit 441 that removably holds a power pack 2, and an electric equipment unit 442 that accommodates various electric and electronic circuits. A charge station control device 443 and a charge device 444 are accommodated in the electric equipment unit 442.

The holding unit 441 includes a charge connector 445 that electrically connects to an electrode of a power pack 2, and a lock mechanism 446 that disables the power pack 2 to be removed, according to an instruction from the charge station control device 443. The lock mechanism 446 includes, for example, an electric key that locks and disables a cover of a power pack outlet, which is formed inside or on an outer face of the first vehicle 4, to be opened or closed, or an electrically controlled latch mechanism that catches on and disables the power pack 2 accommodated in the holding unit 441 to be removed.

The charge station control device 443 is a device that controls each part of the charge station 44, and includes a processor such as a CPU or an MPU, a memory, and an interface circuit for connection with another device and sensors. The processor implements various functions of the charge station 44 by executing a computer program stored in the memory.

The charge device 444 is a device that charges a power pack 2 by using electricity supplied from an in-vehicle battery 46 mounted in the first vehicle 4. The charge device 444 supplies electricity to a power pack 2 held by the holding unit 441, according to an electricity supply instruction from the charge station control device 443. For each power pack 2 held by the holding unit 441, the charge station control device 443 manages a correspondence between the battery ID and the connected charge connector 445. The charge station control device 443 can issue an electricity supply instruction for a specific power pack 2 by using such a correspondence. Note that the in-vehicle battery 46 may be a battery that is removable from the first vehicle 4, or a battery that is unremovable from the first vehicle 4.

The first location device 45 is a device that detects a current position of the first vehicle 4, and includes a GNSS (global navigation satellite system) receiver that receives positioning signals transmitted from a plurality of positioning satellites. The first location device 45 outputs a result of the detection to the vehicle control device 40.

The processor 400 functions as a first communication control section 401, a second communication control section 402, an instruction section 403, a first display control section 404, a first reception section 405, a decoration state acquisition section 406, a battery decoration notification section 407, and a message generation section 408, by reading and executing the control program 411 stored in the memory 410.

The first communication control section 401 communicates with the management server 9 via the first communication device 41. The first communication control section 401 transmits upload information to the management server 9.

The upload information generated by the first vehicle 4 includes battery information, position information indicating a current position of the first vehicle 4, and an ID (identification) that uniquely specifies the user U1. Moreover, the upload information may include a travel distance of the first vehicle 4. The travel distance of the first vehicle 4 is preferably a cumulative travel distance from a start point where use of the first vehicle 4 is started.

The battery information includes a battery ID that uniquely specifies a power pack 2, and battery state information, for each power pack 2 set in the first vehicle 4. For example, when three power packs 2 are set in the first vehicle 4, the battery information includes respective combinations of the battery ID and the battery state information for the three power packs 2. A state of a power pack 2 indicated by the battery state information indicates an amount of charge in the power pack 2, and whether or not the power pack 2 is being charged. The current position of the first vehicle 4 indicated by the position information is a current position detected by the first location device 45. The battery ID is identification information that uniquely specifies each power pack 2.

The second communication control section 402 communicates with a power pack 2 via the second communication device 42. The second communication control section 402 receives a battery ID and battery state information from each power pack 2 set in the first vehicle 4.

The instruction section 403 makes various instructions to the charge station 44. The instruction section 403 outputs an instruction to release the lock mechanism 446 to the charge station control device 443. When the instruction to release the lock mechanism 446 is inputted from the instruction section 403, the charge station control device 443 releases a locked state of the lock mechanism 446. The instruction section 403 outputs a charge execution instruction for a power pack 2 to the charge station control device 443. When the charge execution instruction is inputted from the instruction section 403, the charge station control device 443 outputs an electricity supply instruction to the charge device 444.

The first display control section 404 causes the touch panel 430 to display information.

The first reception section 405 receives an operation made on the touch panel 430.

The decoration state acquisition section 406 acquires information related to a state of decoration on a power pack 2 mounted in the charge station 44.

For example, each power pack 2 may have a configuration in which a secondary battery is accommodated in a boxy case, and may be provided with a handle for a user U to easily carry the power pack 2. A decoration can be applied to a power pack 2 in the present embodiment. The decoration is, for example, an object or paint that changes an appearance of the power pack 2. The decoration on the power pack 2 may be a decoration that affects a function of the power pack 2, or a decoration that does not. Specifically, examples of the decoration can include a cover, a handle cover, a name plate, a sticker, and a coat of paint over a cover, but the decoration may be another object or paint. The decoration may be added to the power pack 2, or may be attached in such a manner that one or some of components of the power pack 2 are replaced with the decoration.

The decoration state acquisition section 406 acquires information about presence or absence of a decoration on a power pack 2 mounted in the charge station 44, and information related to a type of the decoration on the power pack 2, for each power pack 2. For example, the decoration state acquisition section 406 acquires the information that is inputted by the user U1 through operation of the touch panel 430. The decoration state acquisition section 406 may determine presence or absence of a decoration on a power pack 2 and a type of the decoration on the power pack 2 by acquiring an image picked up by an undepicted camera disposed in a vehicle cabin of the first vehicle 4, and analyzing the picked-up image. When a decoration on a power pack 2 includes a wireless communication device or a wireless tag, the decoration state acquisition section 406 may detect the decoration on the power pack 2 and determine a type of the decoration by performing, by using the second communication device 42, wireless communication with the decoration on the power pack 2.

The battery decoration notification section 407 generates decoration information related to the decoration on each power pack 2, based on the information acquired by the decoration state acquisition section 406. The battery decoration notification section 407 transmits the generated decoration information to the management server 9.

The message generation section 408 generates a message addressed to another vehicle or the like included in the rental system 1, and transmits the message to the management server 9 via the first communication device 41. For example, the message designates the ID of a user U as a destination. The message transmitted by the message generation section 408 is relayed by the management server 9, and transmitted to a vehicle used by the destination user U.

4. Configuration of Second Vehicle

Figure 3:
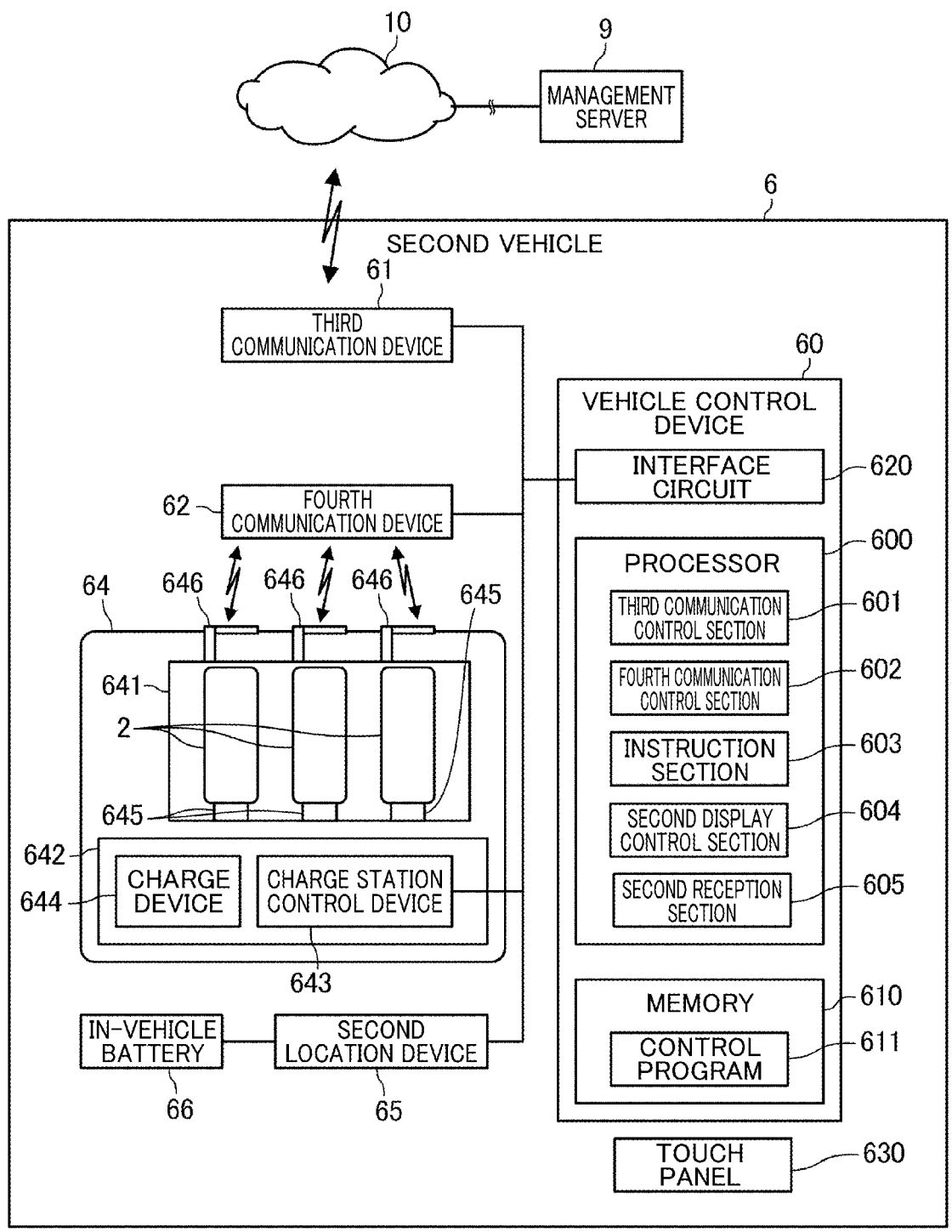
FIG. 3 shows a configuration of a second vehicle.

Next, a configuration of the second vehicle 6 is described. FIG. 3 shows the configuration of the second vehicle 6.

The second vehicle 6 includes the vehicle control device 60, the third communication device 61, a fourth communication device 62, the charge station 64, and a second location device 65.

The vehicle control device 60 is a device that controls each part of the second vehicle 6. The vehicle control device 60 includes a processor 600 such as a CPU or an MPU, a memory 610, an interface circuit 620 to which another device and sensors are connected, and a touch panel 630.

The memory 610 is a storage device (storage medium) that stores a program to be executed by the processor 600 and data in a nonvolatile manner. The memory 610 is configured by using a magnetic storage device, a semiconductor storage element such as a flash ROM, or another type of nonvolatile storage device. The memory 610 may include a RAM on which a work area for the processor 600 is configured. The memory 610 may include a nonvolatile storage device such as an HDD or an SSD. The memory 610 stores data to be processed by the processor 600 and a control program 611 to be executed by the processor 600.

The touch panel 630 has a configuration in which a liquid crystal display panel that displays letters and images, and a touch sensor that detects contact with the liquid crystal display panel are superposed.

The third communication device 61, the fourth communication device 62, the charge station 64, and the second location device 65 are connected to the vehicle control device 60.

The charge station 64 includes a holding unit 641 that removably holds a power pack 2, and an electric equipment unit 642 that accommodates various electric and electronic circuits. A charge station control device 643 and a charge device 644 are accommodated in the electric equipment unit 642.

The holding unit 641 includes a charge connector 645 that electrically connects to an electrode of a power pack 2, and a lock mechanism 646 that disables the power pack 2 to be removed, according to an instruction from the charge station control device 643. The lock mechanism 646 includes, for example, an electric key that locks and disables a cover of a power pack outlet, which is formed inside or on an outer face of the second vehicle 6, to be opened or closed, or an electrically controlled latch mechanism that catches on and disables the power pack 2 accommodated in the holding unit 641 to be removed.

The charge station control device 643 is a device that controls each part of the charge station 64, and includes a processor such as a CPU or an MPU, a memory, and an interface circuit for connection with another device and sensors. The processor implements various functions of the charge station 64 by executing a computer program stored in the memory.

The charge device 644 is a device that charges a power pack 2 by using electricity supplied from an in-vehicle battery 66 mounted in the second vehicle 6. The charge device 644 supplies electricity to a power pack 2 held by the holding unit 641, according to an electricity supply instruction from the charge station control device 643. For each power pack 2 held by the holding unit 641, the charge station control device 643 manages a correspondence between the battery ID and the connected charge connector 645. The charge station control device 643 can issue an electricity supply instruction for a specific power pack 2 by using such a correspondence. Note that the in-vehicle battery 66 may be a battery that is removable from the second vehicle 6, or a battery that is unremovable from the second vehicle 6.

The second location device 65 is a device that detects a current position of the second vehicle 6, and includes a GNSS receiver that receives positioning signals transmitted from the plurality of positioning satellites. The second location device 65 outputs a result of the detection to the vehicle control device 60.

The processor 600 functions as a third communication control section 601, a fourth communication control section 602, an instruction section 603, a second display control section 604, and a second reception section 605, by reading and executing the control program 611 stored in the memory 610.

The third communication control section 601 communicates with the management server 9 via the third communication device 61. The third communication control section 601 transmits upload information to the management server 9.

The upload information generated by the second vehicle 6 includes battery information, position information indicating a current position of the second vehicle 6, and an ID that uniquely specifies the user U2. The upload information of the second vehicle 6 may include a travel distance of the second vehicle 6.

The battery information included in the upload information of the second vehicle 6 is similar to that in the upload information of the first vehicle 4. In other words, the battery information, similarly to that in the upload information of the first vehicle 4, includes a battery ID that uniquely specifies a power pack 2, and battery state information, for each power pack 2 set in the second vehicle 6. The position information included in the upload information indicates a current position of the second vehicle 6 detected by the second location device 65.

The fourth communication control section 602 communicates with a power pack 2 via the fourth communication device 62. The fourth communication control section 602 receives a battery ID and battery state information from each power pack 2 set in the second vehicle 6.

The instruction section 603 makes various instructions to the charge station 64. The instruction section 603 outputs an instruction to release the lock mechanism 646 to the charge station control device 643. When the instruction to release the lock mechanism 646 is inputted from the instruction section 603, the charge station control device 643 releases a locked state of the lock mechanism 646. The instruction section 603 outputs a charge execution instruction for a power pack 2 to the charge station control device 643. When the charge execution instruction is inputted from the instruction section 603, the charge station control device 643 outputs an electricity supply instruction to the charge device 644.

The second display control section 604 causes the touch panel 630 to display information.

The second reception section 605 receives an operation made on the touch panel 630.

The second vehicle 6 may be configured to include functional sections similar to the decoration state acquisition section 406, the battery decoration notification section 407, and the message generation section 408 of the first vehicle 4.

5. Configuration of Third Vehicle

Figure 4:
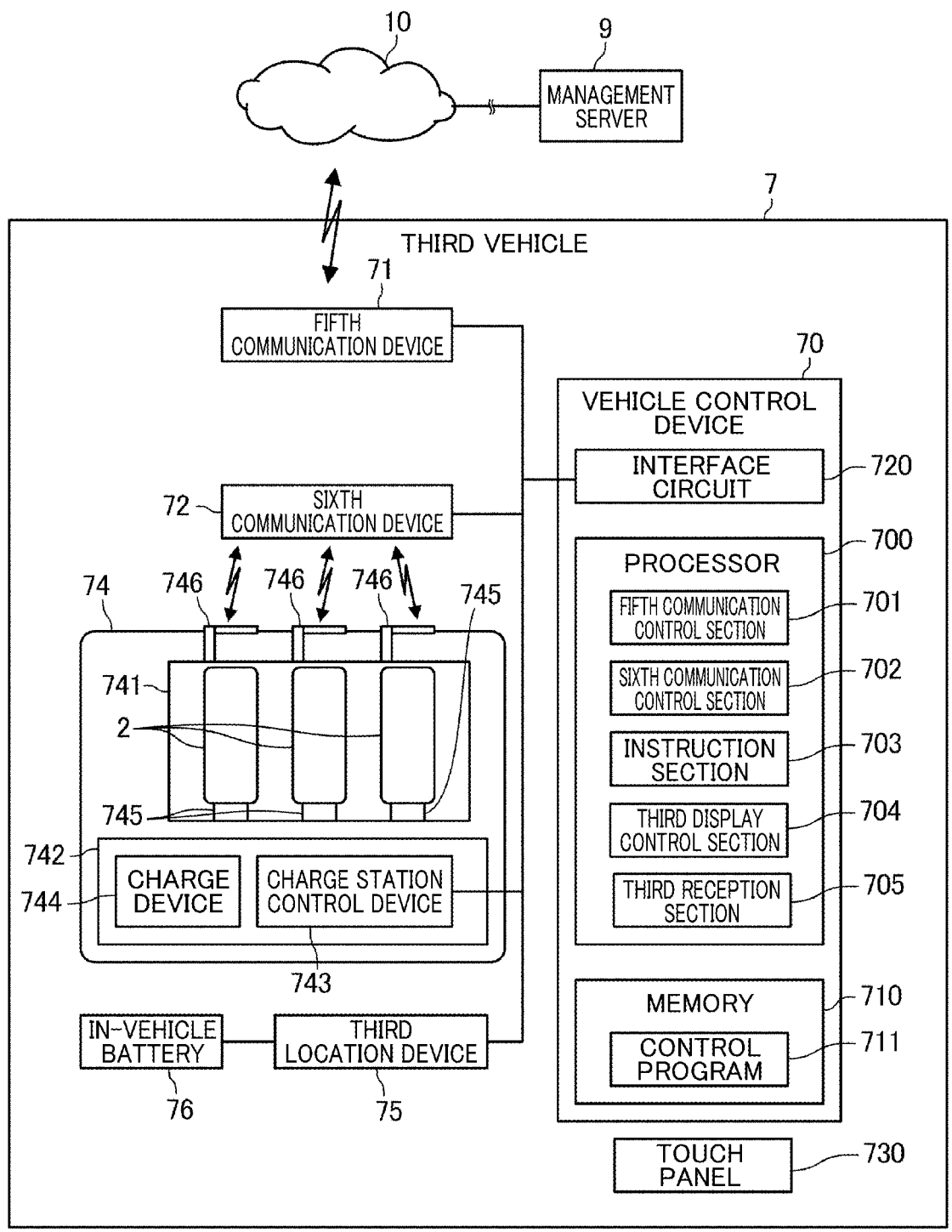
FIG. 4 shows a configuration of a third vehicle.

Next, a configuration of the third vehicle 7 is described. FIG. 4 shows the configuration of the third vehicle 7.

The third vehicle 7 includes the vehicle control device 70, the fifth communication device 71, a sixth communication device 72, the charge station 74, and a third location device 75.

The vehicle control device 70 is a device that controls each part of the third vehicle 7. The vehicle control device 70 includes a processor 700 such as a CPU or an MPU, a memory 710, an interface circuit 720 to which another device and sensors are connected, and a touch panel 730.

The memory 710 is a storage device (storage medium) that stores a program to be executed by the processor 700 and data in a nonvolatile manner. The memory 710 is configured by using a magnetic storage device, a semiconductor storage element such as a flash ROM, or another type of nonvolatile storage device. The memory 710 may include a RAM on which a work area for the processor 700 is configured. The memory 710 may include a nonvolatile storage device such as an HDD or an SSD. The memory 710 stores data to be processed by the processor 700 and a control program 711 to be executed by the processor 700.

The touch panel 730 has a configuration in which a liquid crystal display panel that displays letters and images, and a touch sensor that detects contact with the liquid crystal display panel are superposed.

The fifth communication device 71, the sixth communication device 72, the charge station 74, and the third location device 75 are connected to the vehicle control device 70.

The charge station 74 includes a holding unit 741 that removably holds a power pack 2, and an electric equipment unit 742 that accommodates various electric and electronic circuits. A charge station control device 743 and a charge device 744 are accommodated in the electric equipment unit 742.

The holding unit 741 includes a charge connector 745 that electrically connects to an electrode of a power pack 2, and a lock mechanism 746 that disables the power pack 2 to be removed, according to an instruction from the charge station control device 743. The lock mechanism 746 includes, for example, an electric key that locks and disables a cover of a power pack outlet, which is formed inside or on an outer face of the third vehicle 7, to be opened or closed, or an electrically controlled latch mechanism that catches on and disables the power pack 2 accommodated in the holding unit 741 to be removed.

The charge station control device 743 is a device that controls each part of the charge station 74, and includes a processor such as a CPU or an MPU, a memory, and an interface circuit for connection with another device and sensors. The processor implements various functions of the charge station 74 by executing a computer program stored in the memory.

The charge device 744 is a device that charges a power pack 2 by using electricity supplied from an in-vehicle battery 76 mounted in the third vehicle 7. The charge device 744 supplies electricity to a power pack 2 held by the holding unit 741, according to an electricity supply instruction from the charge station control device 743. For each power pack 2 held by the holding unit 741, the charge station control device 743 manages a correspondence between the battery ID and the connected charge connector 745. The charge station control device 743 can issue an electricity supply instruction for a specific power pack 2 by using such a correspondence. Note that the in-vehicle battery 76 may be a battery that is removable from the third vehicle 7, or a battery that is unremovable from the third vehicle 7.

The third location device 75 is a device that detects a current position of the third vehicle 7, and includes a GNSS receiver that receives positioning signals transmitted from the plurality of positioning satellites. The third location device 75 outputs a result of the detection to the vehicle control device 70.

The processor 700 functions as a fifth communication control section 701, a sixth communication control section 702, an instruction section 703, a third display control section 704, and a third reception section 705, by reading and executing the control program 711 stored in the memory 710.

The fifth communication control section 701 communicates with the management server 9 via the fifth communication device 71. The fifth communication control section 701 transmits upload information to the management server 9.

The upload information generated by the third vehicle 7 includes battery information, position information indicating a current position of the third vehicle 7, and an ID that uniquely specifies the user U3. The upload information of the third vehicle 7 may include a travel distance of the third vehicle 7.

The battery information included in the upload information of the third vehicle 7 is similar to that in the upload information of the first vehicle 4. In other words, the battery information, similarly to that in the upload information of the first vehicle 4, includes a battery ID that uniquely specifies a power pack 2, and battery state information, for each power pack 2 set in the third vehicle 7. The position information included in the upload information indicates a current position of the third vehicle 7 detected by the third location device 75.

The sixth communication control section 702 communicates with a power pack 2 via the sixth communication device 72. The sixth communication control section 702 receives a battery ID and battery state information from each power pack 2 set in the third vehicle 7.

The instruction section 703 makes various instructions to the charge station 74. The instruction section 703 outputs an instruction to release the lock mechanism 746 to the charge station control device 743. When the instruction to release the lock mechanism 746 is inputted from the instruction section 703, the charge station control device 743 releases a locked state of the lock mechanism 746. The instruction section 703 outputs a charge execution instruction for a power pack 2 to the charge station control device 743. When the charge execution instruction is inputted from the instruction section 703, the charge station control device 743 outputs an electricity supply instruction to the charge device 744.

The third display control section 704 causes the touch panel 730 to display information.

The third reception section 705 receives an operation made on the touch panel 730.

The third vehicle 7 may be configured to include functional sections similar to the decoration state acquisition section 406, the battery decoration notification section 407, and the message generation section 408 of the first vehicle 4.

6. Configuration of Battery Station

Next, a configuration of the battery station 8 is described.

Figure 5:
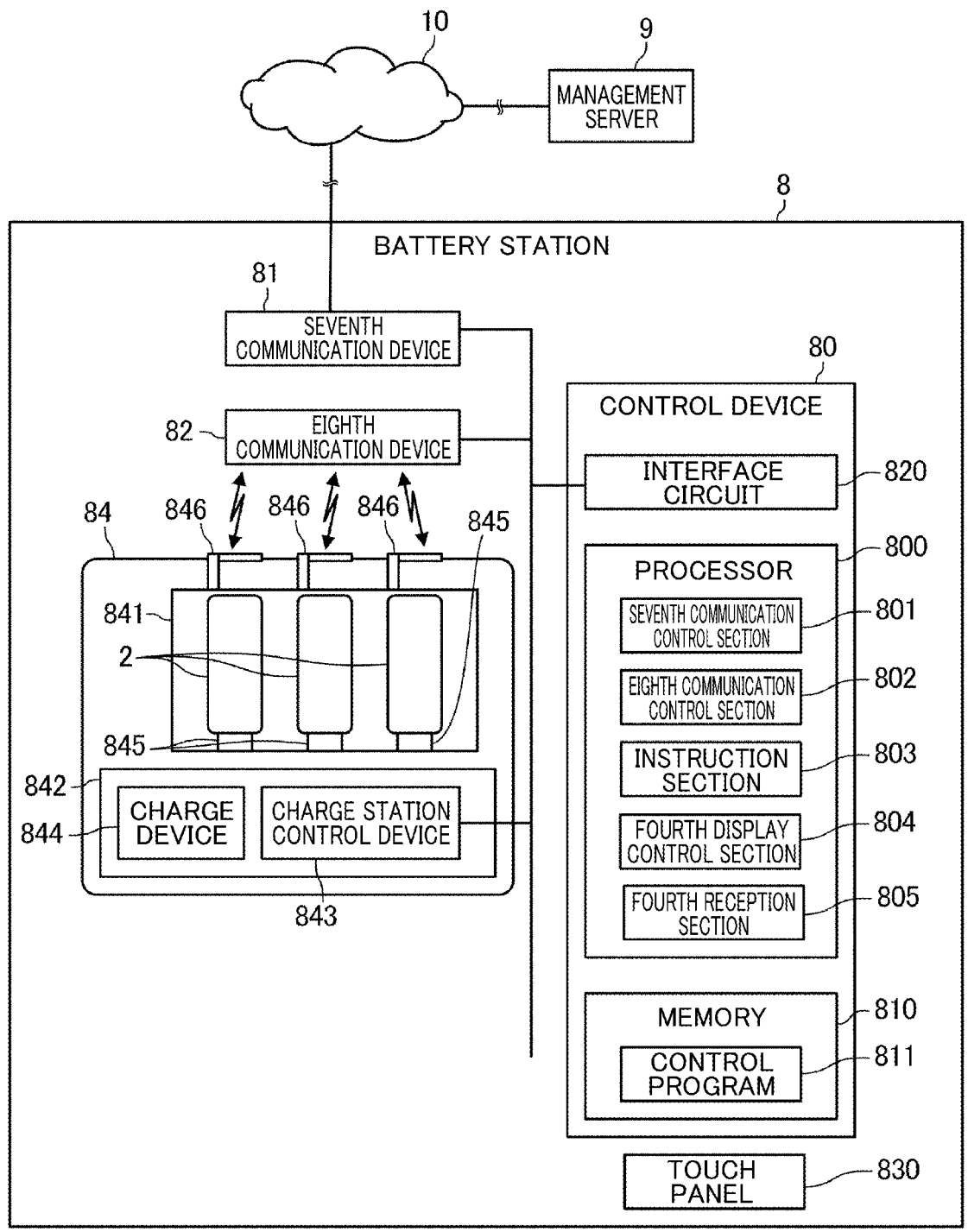
FIG. 5 shows a configuration of a battery station.

FIG. 5 shows the configuration of the battery station 8.

The battery station 8 includes a control device 80, the seventh communication device 81, an eighth communication device 82, and a charge station 84.

The control device 80 is a device that controls each part of the battery station 8. The control device 80 includes a processor 800 such as a CPU or an MPU, a memory 810, an interface circuit 820 to which another device and sensors are connected, and a touch panel 830.

The memory 810 is a storage device (storage medium) that stores a program to be executed by the processor 800 and data in a nonvolatile manner. The memory 810 is configured by using a magnetic storage device, a semiconductor storage element such as a flash ROM, or another type of nonvolatile storage device. The memory 810 may include a RAM on which a work area for the processor 800 is configured. The memory 810 may include a nonvolatile storage device such as an HDD or an SSD. The memory 810 stores data to be processed by the processor 800 and a control program 811 to be executed by the processor 800.

The touch panel 830 has a configuration in which a liquid crystal display panel that displays letters and images, and a touch sensor that detects contact with the liquid crystal display panel are superposed.

The seventh communication device 81, the eighth communication device 82, and the charge station 84 are connected to the control device 80.

The charge station 84 includes a holding unit 841 that removably holds a power pack 2, and an electric equipment unit 842 that accommodates various electric and electronic circuits. A charge station control device 843 and a charge device 844 are accommodated in the electric equipment unit 842.

The holding unit 841 includes a charge connector 845 that electrically connects to an electrode of a power pack 2, and a lock mechanism 846 that disables the power pack 2 to be removed, according to an instruction from the charge station control device 843. The lock mechanism 846 includes, for example, an electric key that locks and disables a cover of a power pack outlet, which is formed inside or on an outer face of the battery station 8, to be opened or closed, or an electrically controlled latch mechanism that catches on and disables the power pack 2 accommodated in the holding unit 841 to be removed.

The charge station control device 843 is a device that controls each part of the charge station 84, and includes a processor such as a CPU or an MPU, a memory, and an interface circuit for connection with another device and sensors. The processor implements various functions of the charge station 84 by executing a computer program stored in the memory.

The charge device 844 is a device that charges a power pack 2 by using electricity supplied from an undepicted external power supply. The charge device 844 supplies electricity to a power pack 2 held by the holding unit 841, according to an electricity supply instruction from the charge station control device 843. For each power pack 2 held by the holding unit 841, the charge station control device 843 manages a correspondence between the battery ID and the connected charge connector 845. The charge station control device 843 can issue an electricity supply instruction for a specific power pack 2 by using such a correspondence.

The processor 800 functions as a seventh communication control section 801, an eighth communication control section 802, an instruction section 803, a fourth display control section 804, and a fourth reception section 805, by reading and executing the control program 811 stored in the memory 810.

The seventh communication control section 801 communicates with the management server 9 via the seventh communication device 81. The seventh communication control section 801 transmits upload information to the management server 9.

The upload information generated by the battery station 8 includes battery information and a battery station ID for identification of the battery station 8. Since it is supposed that the battery station 8 does not move, the upload information of the battery station 8 may omit to include position information on the battery station 8. When the battery station 8 is mobile, the upload information of the battery station 8 may include position information on the battery station 8. In such a case, the battery station 8 may include a location device that detects a current position of the battery station 8. Embodiments of the mobile battery station 8 include, for example, a configuration in which the battery station 8 is installed in back of a cargo vehicle, and a configuration in which the battery station 8 is installed in a towed vehicle. The upload information of the battery station 8 may include a flag indicating that the source of the upload information is the battery station 8.

The battery information included in the upload information of the battery station 8 is similar to that in the upload information of the first vehicle 4 and the second vehicle 6. In other words, the battery information includes a battery ID that uniquely specifies a power pack 2, and battery state information, for each power pack 2 set in the battery station 8.

The eighth communication control section 802 communicates with a power pack 2 via the eighth communication device 82. The eighth communication control section 802 receives a battery ID and battery state information from each power pack 2 set in the battery station 8.

The instruction section 803 makes various instructions to the charge station 84. The instruction section 803 outputs an instruction to release the lock mechanism 846 to the charge station control device 843. When the instruction to release the lock mechanism 846 is inputted from the instruction section 803, the charge station control device 843 releases a locked state of the lock mechanism 846. The instruction section 803 outputs a charge execution instruction for a power pack 2 to the charge station control device 843. When the charge execution instruction is inputted from the instruction section 803, the charge station control device 843 outputs an electricity supply instruction to the charge device 844.

The fourth display control section 804 causes the touch panel 830 to display information.

The fourth reception section 805 receives an operation made on the touch panel 830.

7. Configuration of Management Server

Next, a configuration of the management server is described.

Figure 6:
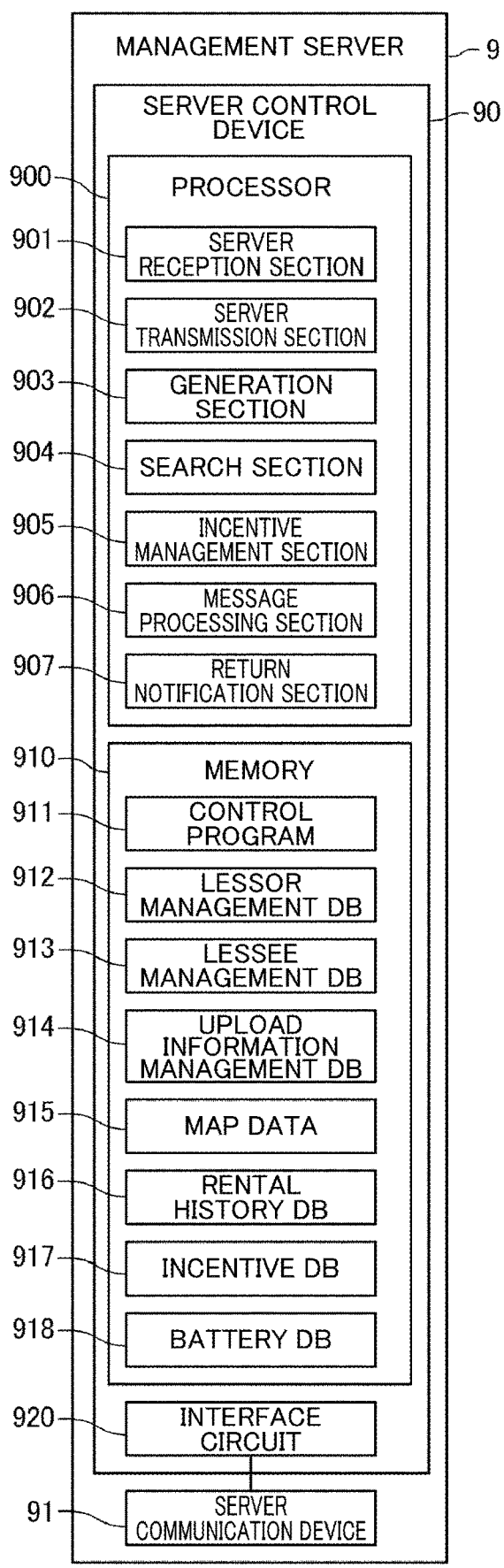
FIG. 6 shows a configuration of a management server.

FIG. 6 shows the configuration of the management server 9.

The management server 9 includes a server control device 90, and a server communication device 91.

The server control device 90 is a device that controls each part of the management server 9. The server control device 90 includes a processor 900 such as a CPU or an MPU, a memory 910, and an interface circuit 920 to which the server communication device 91 is connected.

The memory 910 is a storage device (storage medium) that stores a program to be executed by the processor 900 and data in a nonvolatile manner. The memory 910 is configured by using a magnetic storage device, a semiconductor storage element such as a flash ROM, or another type of nonvolatile storage device. The memory 910 may include a RAM on which a work area for the processor 900 is configured. The memory 910 may include a nonvolatile storage device such as an HDD or an SSD. The memory 910 stores data to be processed by the processor 900, a control program 911 to be executed by the processor 900, a lessor management DB (database) 912, a lessee management DB 913, an upload information management DB 914, map data 915, a rental history DB 916, an incentive DB 917, and a battery DB 918.

Figure 7:
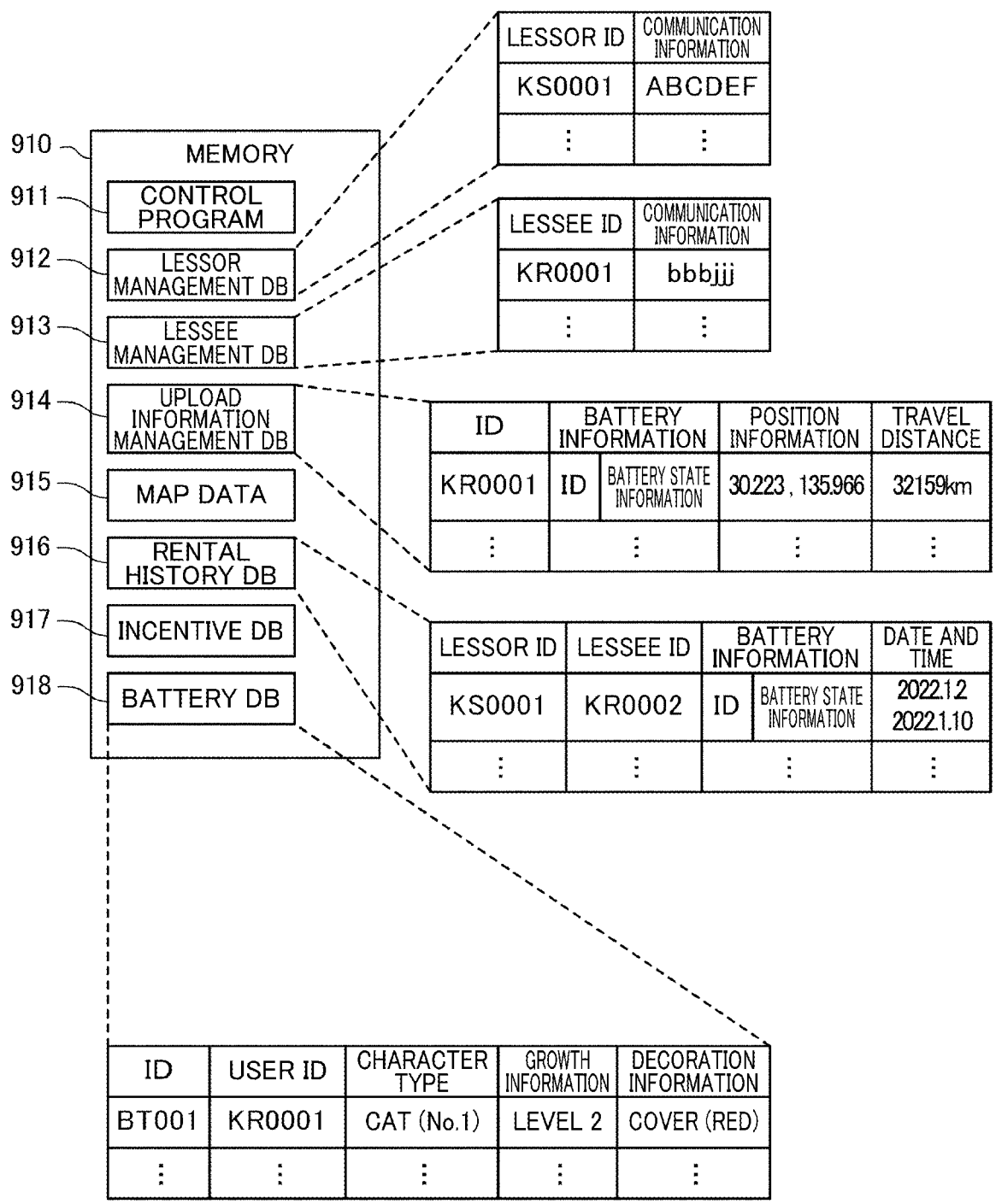
FIG. 7 shows an example of a configuration of data stored in the management server.

FIG. 7 shows an example of a configuration of data stored in the management server 9. FIG. 7 schematically shows an example of the data stored in the memory 910.

As shown in FIG. 7, the lessor management DB 912 stores information related to users U, for each user U who is a lessor. The lessor-related information includes a lessor ID, and communication information for communication with the first vehicle 4 operated by the lessor. The lessor ID is an ID of a user U serving as a lessor. An example of the communication information is address information on the first communication device 41.

The lessee management DB 913 stores information related to users U, for each user U who is a lessee. The lessee-related information includes a lessee ID, and lessee information indicating a name of the lessee and a face picture of the lessee. The lessee ID is an ID of a user U serving as a lessee.

The users U1, U2, U3 can be a lessor who rents a power pack 2 out, and can be a lessee who rents a power pack 2. Accordingly, information on the same user U may be stored in both the lessor management DB 912 and the lessee management DB 913.

The upload information management DB 914 stores upload information.

The map data 915 is data that stores road map information, facility information on various facilities and the like, data for map matching, and the like. The road map information includes a road network in which roads on a map are represented by lines, and includes information related to links that are defined by dividing the roads into a plurality of sections at intersections, forks, and the like as nodes, and defining each section between two neighboring nodes as a link. The facility information indicates a position (latitude, longitude) of a facility, a name of the facility, an image of the facility, and the like. The map data 915 includes image data on the map.

The rental history DB 916 stores information related to details of a rental transaction when rental of a power pack 2 takes place. For the information stored in the rental history DB 916, for example, one record is configured for one rental transaction of one power pack 2. Each record stored in the rental history DB 916 includes the ID of a lessor, the ID of a lessee, battery information on a power pack 2, and a date and time of rental and/or a date and time of return. The battery information includes, for example, the ID of the power pack 2, and information on a battery state of the power pack 2 at a time when the power pack 2 is rented out.

As described above, a lessee of a power pack 2 can continue using the power pack 2 without returning the power pack 2 to the lessor. Accordingly, a record stored in the rental history DB 916 may omit to include a date and time of return. A record stored in the rental history DB 916 may include information on a place of return to which a lessee of a power pack 2 has returned the power pack 2. The place of return is any one of a lessor, a different user U from the lessor, and the battery station 8.

The incentive DB 917 stores information indicating a content of an incentive given to a user U using the rental system 1. An incentive given to a user U in the rental system 1 may be money, or a point having an economic value. An incentive may be a right to use of a service provided by the provider running the rental system 1 or another business provider. It is preferable that an incentive given to a user U in the rental system 1 be comparable in value. When an incentive is a right to use of a service, an indicator indicating a value of the right to use is tentatively associated with the right to use, in order to compare the value of the right to use with money or a value of another incentive.

Based on the information stored in the incentive DB 917, a user U using the rental system 1 can receive actual payment of money, provision of a product based on points, provision of a service based on points and an incentive, a discount at a time of buying a product or a service, or the like.

The battery DB 918 stores information related to a power pack 2 used in the rental system 1. For the information stored in the battery DB 918, for example, one record corresponding to one power pack 2 is configured. Each record stored in the battery DB 918 includes the ID of a power pack 2, the ID of a user U associated with the power pack 2, information on a character corresponding to the power pack 2, growth information on the character, and decoration information on the power pack 2.

In the rental system 1, a power pack 2 can be associated with a user U. Each power pack 2 given an ID can be associated with one or more users U, among the users U using the rental system 1. Associating a user U and a power pack 2 is for the user U to distinguish the specific individual among power packs 2 from the other power packs 2. Thus, it can be expected that the user U fosters affection for or confidence in the specific individual among power packs 2. A power pack 2 associated with a user U can be rented to and used by another user U, and can also can be subleased. In other words, associating a power pack 2 and a user U does not impose any restrictions on other users U in terms of use of the power pack 2.

For example, a case is assumed where two power packs 2 are associated with the user U1. These power packs 2 are shown as first power packs 2A in FIG. 1. Moreover, power packs 2 that are not associated with the user U1 are shown as second power packs 2B in FIG. 1. The first power packs 2A and the second power packs 2B are not distinguished from each other by performance or specifications as a power pack 2. The specifications of the first power packs 2A and the second power packs 2B may be common, and the specifications of the two first power packs 2A may be different. When referred to as power packs 2 in the present embodiment, the first power packs 2A and the second power packs 2B are not distinguished from each other. When the user U1 corresponds to the first user in the present disclosure, the first power packs 2A correspond to an example of a first battery, and the second power packs 2B correspond to an example of a second battery.

There is no difference between manners of using the first power packs 2A and the second power packs 2B. For example, as shown in FIG. 1, in a state where the two first power packs 2A are mounted in the first vehicle 4, the user U2, U3 can rent any of the first power packs 2A. The user U2, U3 can sublease the first power pack 2A to another user U. The user U2, U3 can return the first power pack 2A to another vehicle than the first vehicle 4 or the battery station 8. The user U1 can rent a power pack 2 from the user U2, U3 or the battery station 8 and mount the power pack 2 in the first vehicle 4.

As a method for making a user U foster affection for a power pack 2, a character is associated with the power pack 2 in the rental system 1. A character is a mascot representing one individual power pack 2.

In the rental system 1, growth information on a character is used to show a user U how the character grows. Although a character is a virtual mascot and therefore does not grow in actuality, it is virtually shown to the user U, by using the growth information, how the character grows, whereby it can be expected that affection of the user U is promoted. The growth information is information indicating each stage of virtual growth of the character. The growth information corresponds to an example of character growth information. In such a case, the battery DB 918 corresponds to an example of a character growth information storage section.

The decoration information is decoration information notified from the battery decoration notification section 407, and indicates presence or absence of a decoration applied to a power pack 2, a type of the decoration, and the like. The management server 9 adds, to an image of a character, a decoration on the character corresponding to the decoration applied to the power pack 2, which will be described later. Here, the battery DB 918 corresponds to an example of a battery decoration information storage section.

A power pack 2 may be associated with a plurality of users U. In such a case, a record in the battery DB 918 corresponds to one combination of the ID of a user U and the ID of the power pack 2. Accordingly, when a power pack 2 is associated with a plurality of users U, records that differ from the ID of one user U to the ID of another are stored in the battery DB 918. Character information and growth information correspond to one record. Accordingly, a character and growth information corresponding to one power pack 2 differ from one user U to another user U.

The growth information is updated according to use of the power pack 2. The growth information is, for example, a parameter indicating a stage of growth of the character, and a greater parameter value indicates a state where the growth of the character has more advanced. The following five factors are listed as examples of factors that cause an update of the growth information.

Factor 1. The amount of charge in the power pack 2 is kept at a predetermined value or more.

Factor 2. The power pack 2 is rented out, and the power pack 2 is returned to the lessor. In other words, a user U that has rented the power pack 2 out receives the power pack 2 back.

Factor 3. A distance traveled by a vehicle in which the power pack 2 is mounted, that is, a travel distance increases.

Factor 4. The power pack 2 is charged with green electricity.

Factor 5. The power pack 2 is used for power supply to a plurality of types of equipment other than a vehicle.

Each factor is weighted. In the rental system 1, a frequency of updates of growth information and/or an amount by which the growth information is increased at one update is set for each factor, according to the factors 1 to 5. A frequency of updates of growth information and/or an amount by which the growth information is increased at one update is referred to as an update amount. For example, an update amount for the factor 1 is at a middle level, an update amount for the factor 2 is at a high level, an update amount for the factor 3 is at a low level, an update amount for the factor 4 is at a high level, and an update amount for the factor 5 is at a high level. When compared, the respective update amounts for the factors are as follows, for example: factor 4>factor 5>factor 2>factor 1>factor 3.

The green electricity refers to, for example, electricity generated by using renewable energy. An example of charging a power pack 2 with green electricity is that the battery station 8 charges the power pack 2 with electricity generated by using renewable energy. When an undepicted solar cell panel is provided to the first vehicle 4, charging a power pack 2 with electricity generated by the solar cell panel corresponds to charging the power pack 2 with green electricity. In such a case, a flag indicating that charge is performed with green electricity, or an amount of electricity charged from green electricity, is stored in an undepicted storage device provided to the power pack 2, or in a record related to the power pack 2 stored in the battery DB 918. Examples of the equipment other than a vehicle include an electrified two-wheeled vehicle, an electrified bicycle, a charge device for charging a smartphone and the like, and a cooking heater.

A character corresponding to a power pack 2 and growth information are associated with a combination of the ID of the power pack 2 and the ID of a user U, but may be configured to be transferable to another power pack 2. Specifically, a character and growth information associated with a combination of the ID of a power pack 2 and the ID of a user U can be associated with a new combination of the ID of the same user U and the ID of another power pack 2. In such a case, when a power pack 2 becomes unusable due to consumption of the power pack 2, a character and growth information are transferred, whereby it can be expected that affection of a user U for a power pack 2 is not impaired, so that use by the user U is promoted.

Obviously, the battery DB 918 can store a record related to a power pack 2 that is not associated with a user U. Moreover, association between a power pack 2 and a user U can be changed, newly set, and cancelled.

Referring back to FIG. 6, the server communication device 91 is a device including a transmitter that transmits data to and a receiver that receives data from the first vehicle 4, the second vehicle 6, and the third vehicle 7. The server communication device 91 may be a wired communication device, or a wireless communication device.

The processor 900 functions as a server reception section 901, a server transmission section 902, a generation section 903, a search section 904, an incentive management section 905, a message processing section 906, and a return notification section 907, by reading and executing the control program 911 stored in the memory 910.

The server reception section 901 corresponds to a reception section in the present disclosure. The server transmission section 902 corresponds to a transmission section in the present disclosure.

The server reception section 901 receives data from the first communication device 41 and the third communication device 61 via the server communication device 91. The server transmission section 902 transmits data to the first communication device 41 and the third communication device 61 via the server communication device 91.

The generation section 903 generates a map image. The map image will be described later.

The search section 904 refers to the map data 915 and searches for a route from a current position of a lessee user U to a destination. In the present embodiment, the search section 904 searches for a route from a current position of the first vehicle 4, as a current position of the user U1.

The incentive management section 905 gives an incentive to a user U. The incentive management section 905 gives an incentive to a lessor user U, according to rental of a power pack 2. The incentive management section 905 gives an incentive to a user U who is a lessee of a power pack 2, according to return of the power pack 2. The incentive management section 905 generates or updates information stored in the incentive DB 917, based on a result of giving an incentive.

The message processing section 906 relays a message transmitted by a user U. Specifically, when any one of the first vehicle 4, the second vehicle 6, and the third vehicle 7 transmits a message to the management server 9, the message processing section 906 transmits the message to a vehicle used by a user U who is a destination of the message. The message processing section 906 can generate an image to be added to the message and transmit the message together with the generated image.

The return notification section 907 gives notification to a user U when a power pack 2 is returned to the battery station 8 and when the user U is associated with the returned power pack 2. For example, when a power pack 2 associated with the user U1 is returned to the battery station 8, the return notification section 907 sends the first vehicle 4 a notification indicating that the power pack 2 is returned to the battery station 8.

8. Operation of Each Part of Rental System

Next, operation of each part of the rental system 1 is described.

First, operation of each part of the rental system 1 related to upload information is described.

Figure 8:
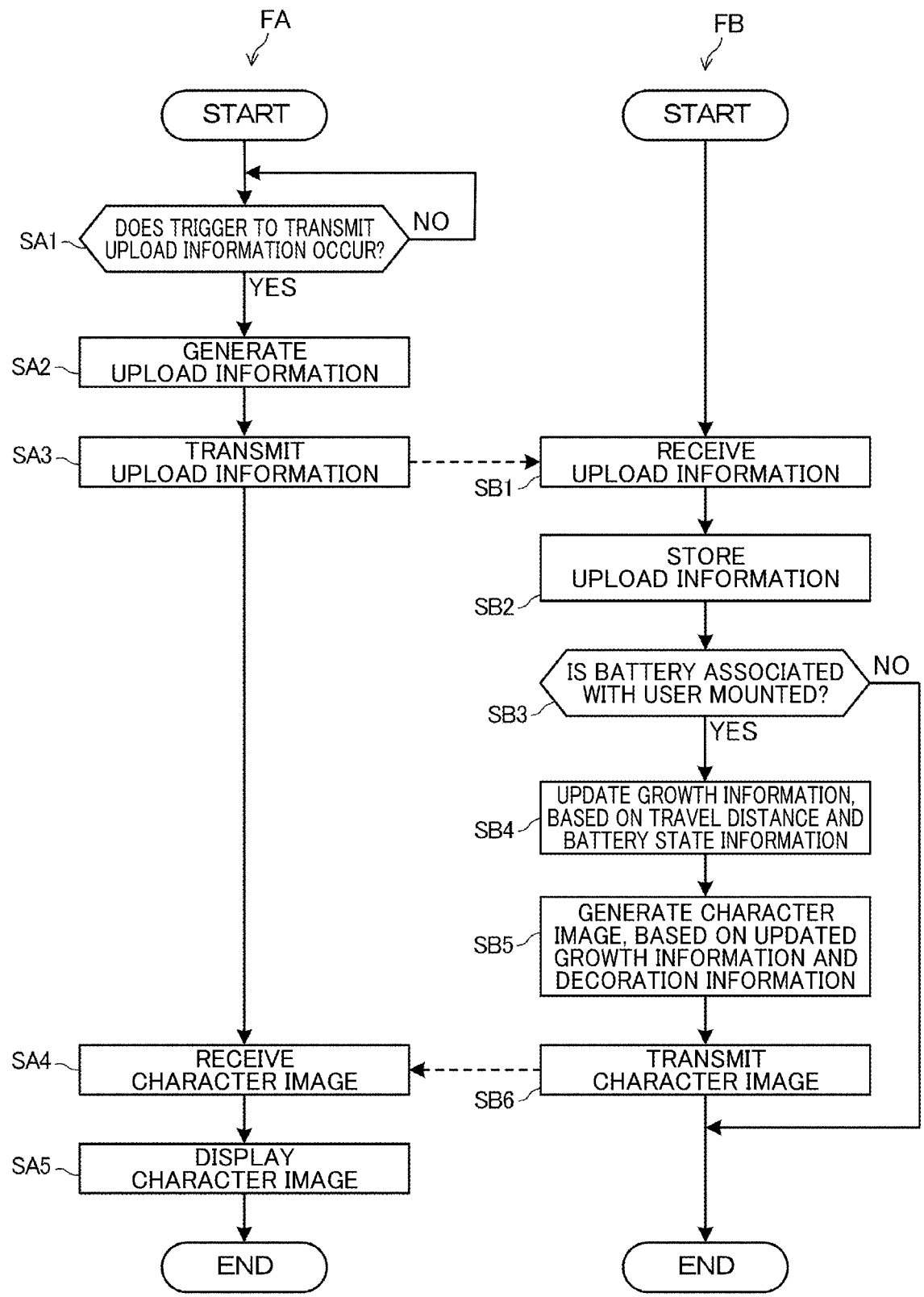
FIG. 8 is flowcharts showing operation in the rental system.

FIG. 8 is flowcharts showing operation in the rental system 1. In FIG. 8, the flowchart FA shows operation of a user terminal that uses and keeps a power pack 2. Specifically, the flowchart FA shows operation of each of the vehicle control device 40, the vehicle control device 60, and the vehicle control device 70. The flowchart FB shows operation of the management server 9.

First, a description is given of a case where the first vehicle 4 performs the operation in the flowchart FA, as an example.

As shown in the flowchart FA, the first communication control section 401 determines whether or not a trigger to transmit upload information occurs (step SA1). Examples of the trigger include a fact that a predetermined time period (for example, 10 minutes) has passed since previous upload information was transmitted, a fact that an ignition of the first vehicle 4 is turned on, a fact that the ignition of the first vehicle 4 is turned off, and the like.

When it is determined that a trigger to transmit upload information occurs (step SA1; YES), the first communication control section 401 generates upload information (step SA2).

In step SA2, the first communication control section 401 acquires, from the second communication device 42, a combination of a battery ID and battery state information received by the second communication device 42. Moreover, the first communication control section 401 acquires position information from the first location device 45. Further, the first communication control section 401 acquires the ID of the user U1 from the memory 410. Furthermore, the first communication control section 401 acquires a travel distance of the first vehicle 4. For example, the first communication control section 401 acquires the travel distance of the first vehicle 4 from an undepicted control device that controls travel of the first vehicle 4. The first communication control section 401 generates the upload information including the acquired information.

Note that the ID of the user U1 is stored beforehand in the memory 410.

The second communication device 42 may acquire the battery ID and the battery state information by performing communication directly with the power pack 2. The second communication device 42 may receive the battery ID and the battery state information from, for example, the charge station control device 443 or the charge device 444.

Returning to the description of the flowchart FA, the first communication control section 401 transmits the generated upload information to the management server 9 (step SA3).

As shown in the flowchart FB, the server reception section 901 receives the upload information from the first vehicle 4 (step SB1).

Subsequently, the server reception section 901 stores the upload information received in step SB1, in the upload information management DB 914 (step SB2).

In step SB2, when upload information including the same ID as the ID of the user U1 included in the upload information received in step SB1 exists in the upload information management DB 914, the server reception section 901 updates the upload information including the same ID with the upload information received in step SB1.

Based on the upload information, the server reception section 901 determines whether or not a power pack 2 associated with the user U1 is mounted in the first vehicle 4 (step SB3). In step SB3, the server reception section 901 performs the determination, based on the ID of the power pack 2 and the ID of the user U1 included in the upload information, and on information stored in the battery DB 918.

When it is determined that a power pack 2 associated with the user U1 is mounted in the first vehicle 4 (step SB3; YES), the server reception section 901 updates growth information stored in the battery DB 918, based on the travel distance and the battery state information included in the upload information (step SB4). Subsequently, the generation section 903 generates a character image, based on the growth information updated in step SB4, as well as character information and decoration information, of the information stored in the battery DB 918 (step SB5). The server transmission section 902 transmits image data on the character image generated in step SB5, or data for display of the character image, to the first vehicle 4 (step SB6), and then terminates the present processing. In a case of transmitting the data on the character image 101, the server transmission section 902 corresponds to an example of a character image transmission section.

When it is determined that a power pack 2 associated with the user U1 is not mounted in the first vehicle 4 (step SB3; NO), the management server 9 terminates the present processing.

The first communication control section 401 receives, by using the first communication device 41, the data on the character image transmitted from the management server 9 (step SA4). Based on the data received in step SA4, the first display control section 404 displays the character image on the touch panel 430 (step SA5). Here, the touch panel 430 corresponds to an example of a display section.

Each of the second vehicle 6 and the third vehicle 7 performs the operation in the flowchart FA.

Each of the first vehicle 4, the second vehicle 6, and the third vehicle 7 included in the rental system 1 transmits upload information to the management server 9 as described above, whereby the management server 9 can accumulate information related to each power pack 2 in each vehicle. Each vehicle displays a character of a power pack 2 associated with a user U.

Figure 9:
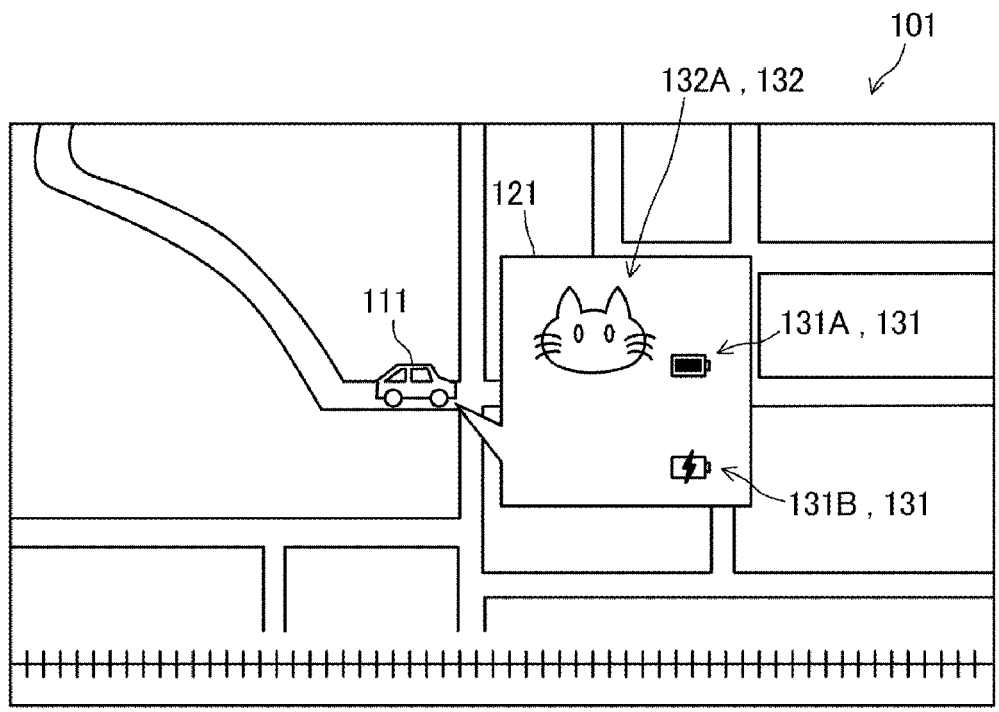
FIG. 9 shows an example of a character image.

FIG. 9 shows an example of the character image 101.

The character image 101 is an image that includes a map centered on a current position of the first vehicle 4 and in which a vehicle image 111 representing the first vehicle 4 is placed in a manner of being superimposed on the map. An information display portion 121 is placed at a position corresponding to the vehicle image 111.

The information display portion 121 is a display portion for displaying a state and a character of a power pack 2 mounted in the first vehicle 4. In the example in FIG. 9, information related to one first power pack 2A and one second power pack 2B mounted in the first vehicle 4 is displayed in the information display portion 121. Specifically, a battery icon 131A indicating an amount of charge in and a charged state of the first power pack 2A, and a battery icon 131B indicating an amount of charge in and a charged state of the second power pack 2B are displayed in the information display portion 121. In addition, a character 132A corresponding to the first power pack 2A is displayed in the information display portion 121. The management server 9 changes a displayed form of the character 132A to a plurality of different forms, according to the growth information. Accordingly, it seems to the user U1 that the character 132A changes with the growth information.

The battery icon 131A and the battery icon 131B are collectively referred to as a battery icon 131. The battery icon 131 can be configured to take a plurality of forms indicating, for example, a state where the amount of charge in the power pack 2 is small, a state where the amount of charge in the power pack 2 is equal to or more than a predetermined value, and a state where the power pack 2 is being charged.

Although FIG. 9 illustrates the character image 101 in which the vehicle image 111 representing the first vehicle 4 is placed on the map of a reference predetermined area centered on a current position of the first vehicle 4, the character image 101 may omit to include the map and the vehicle image 111. The battery icon 131 may be omitted.

Figure 10:
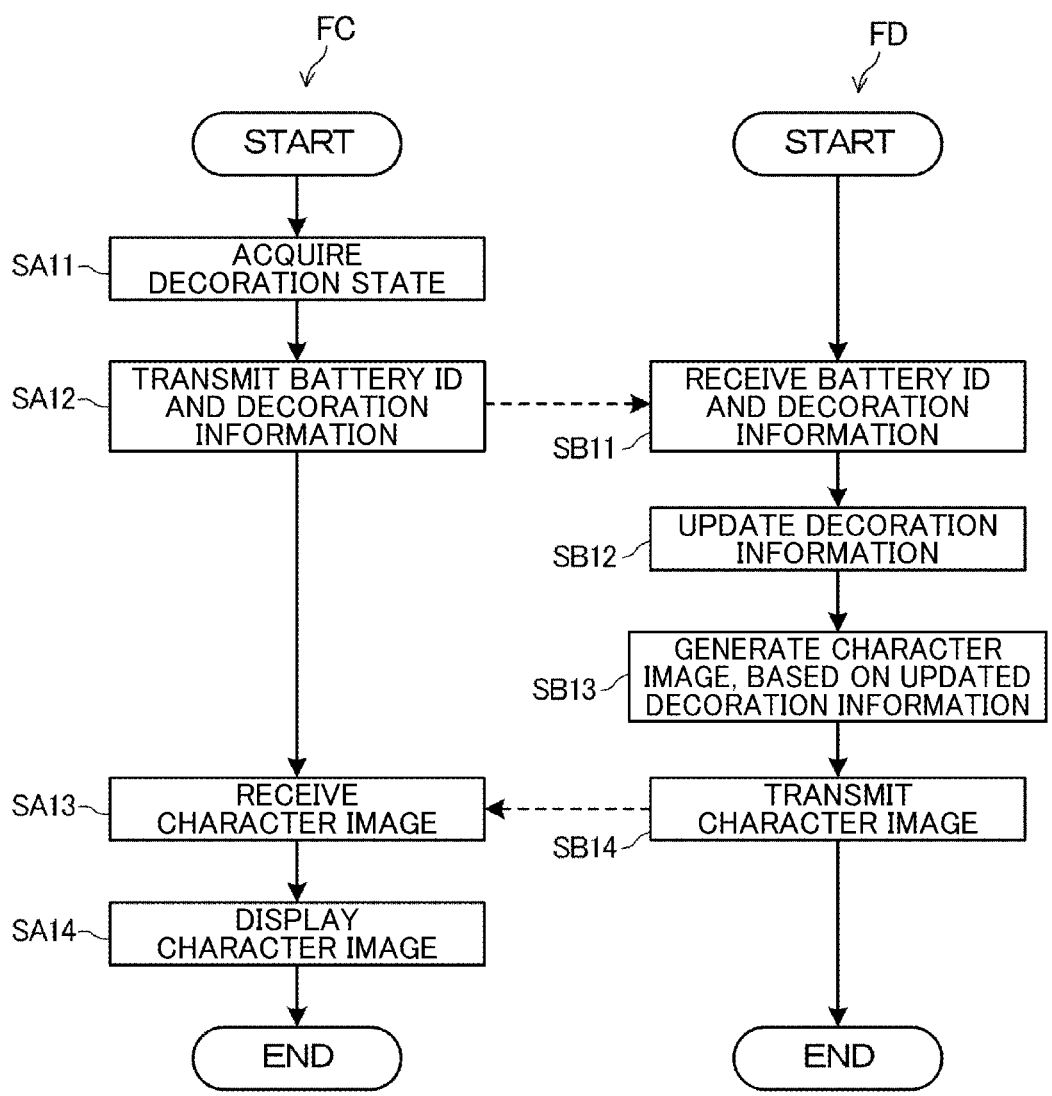
FIG. 10 is flowcharts showing operation in the rental system.

FIG. 10 is flowcharts showing operation in the rental system 1. In FIG. 10, the flowchart FC shows operation of a user terminal that uses and keeps a power pack 2. Specifically, the flowchart FC shows operation of each of the vehicle control device 40, the vehicle control device 60, and the vehicle control device 70. Here, a description is given of a case where the first vehicle 4 performs the operation in the flowchart FC, as an example. The flowchart FD shows operation of the management server 9.

As shown in the flowchart FC, the decoration state acquisition section 406 acquires a decoration state of the power pack 2 (step SA11). The decoration state acquisition section 406 acquires the decoration state, as described above, based on an input made by the user U1 and received by the first reception section 405, or on a result of analyzing an image picked up by the undepicted camera.

The first communication control section 401 transmits the decoration information acquired by the decoration state acquisition section 406, together with the ID of the power pack 2, to the management server 9 (step SA12).

The server reception section 901 receives the decoration information and the ID of the power pack 2 transmitted from the first vehicle 4 (step SB11). Based on the received decoration information, the server reception section 901 updates decoration information stored in the battery DB 918 (step SB12).

The generation section 903 acquires information that is stored in the battery DB 918 in association with the ID received in step SB11, and generates a character image based on the updated decoration information (step SB13). The server transmission section 902 transmits image data on the character image generated in step SB13, or data for display of the character image, to the first vehicle 4 (step SB14), and then terminates the present processing.

The first communication control section 401 receives, by using the first communication device 41, the data on the character image transmitted from the management server 9 (step SA13). Based on the data received in step SA13, the first display control section 404 displays the character image on the touch panel 430 (step SA14).

Each of the second vehicle 6 and the third vehicle 7 performs the operation in the flowchart FC.

When a decoration is added to the power pack 2 as described above, the character image displayed at the first vehicle 4 can be updated to a state in which the decoration information is reflected.

Next, operation in the rental system 1 related to rental of a power pack 2 is described.

Figure 11:
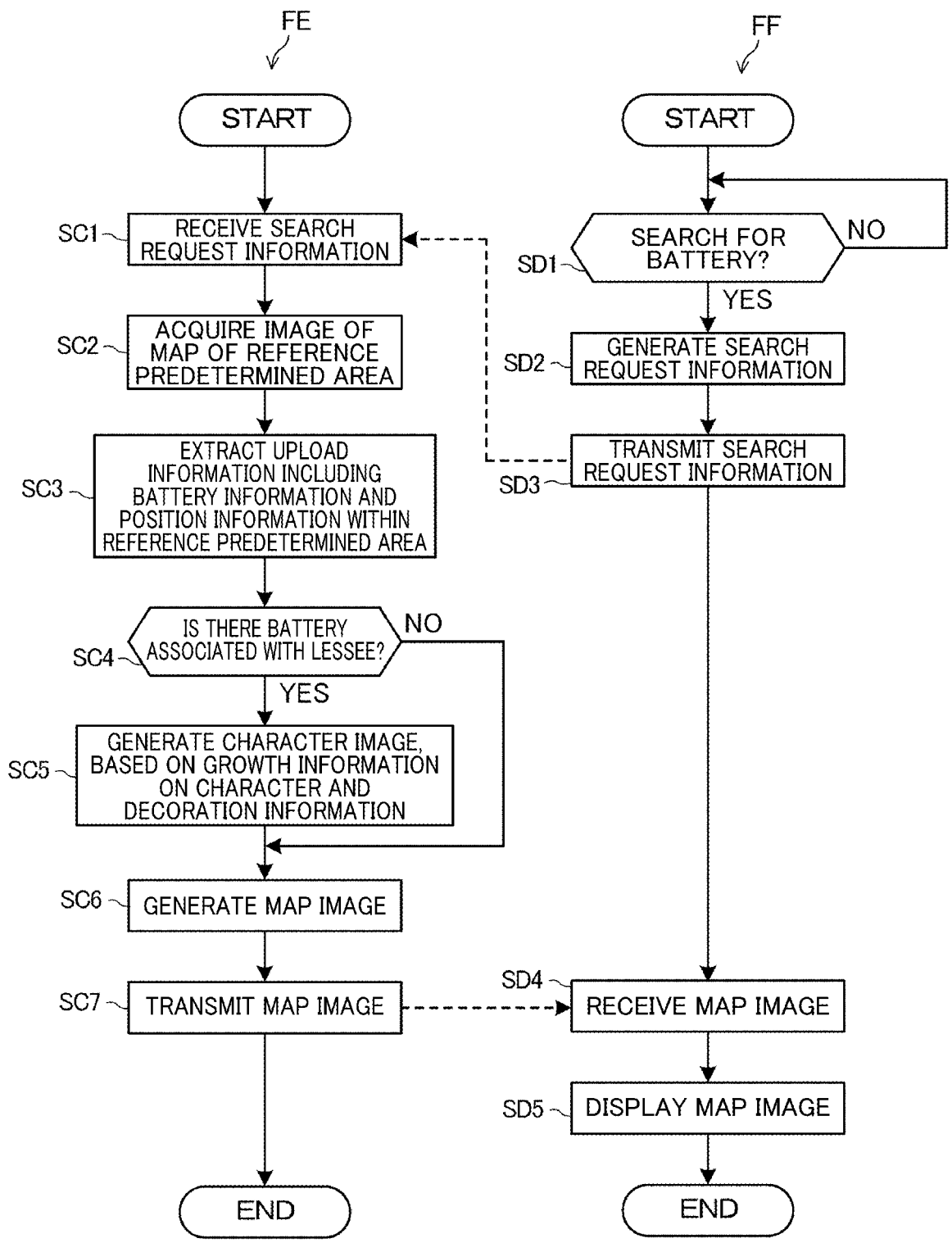
FIG. 11 is flowcharts showing operation in the rental system.
Figure 14:
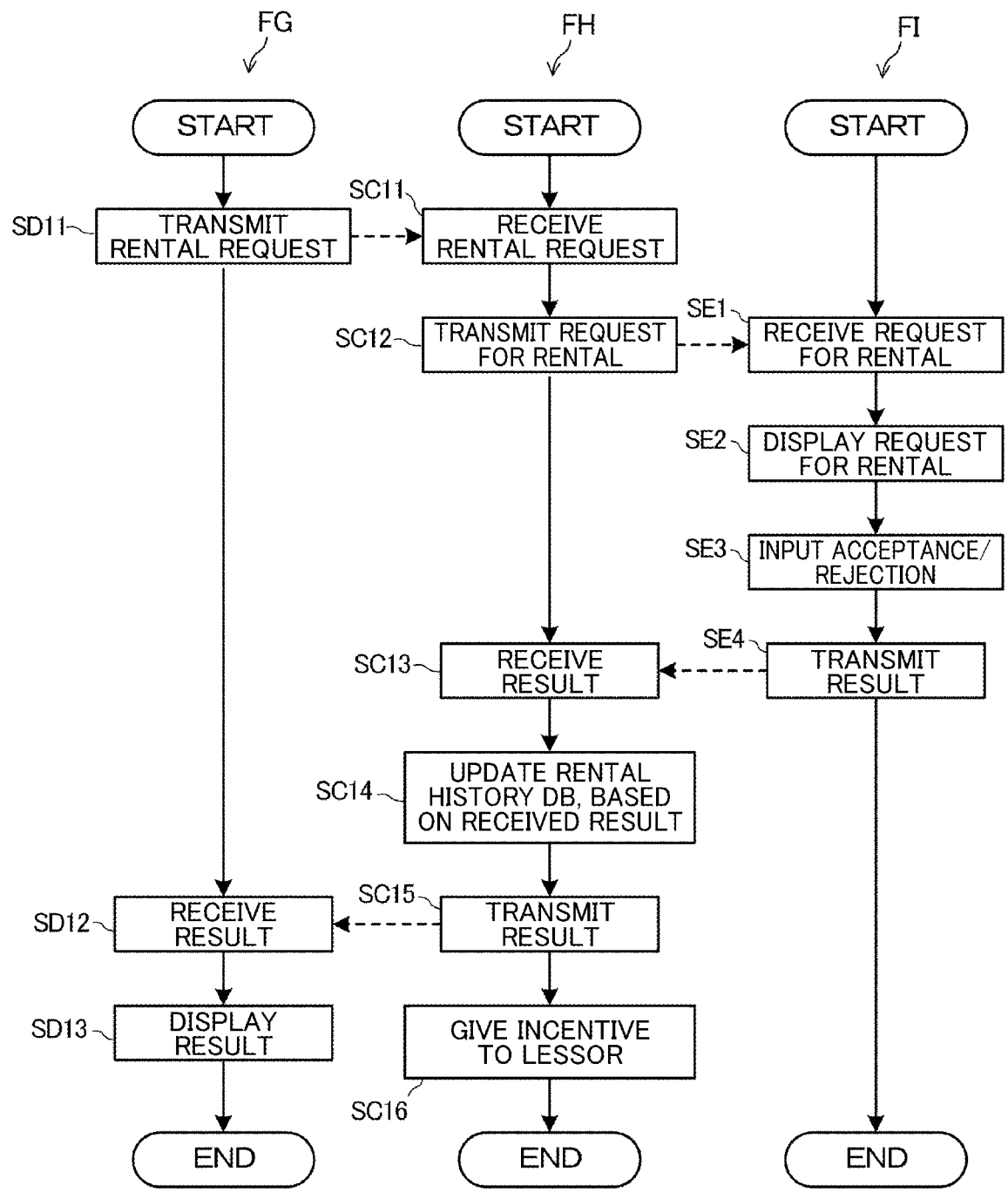
FIG. 14 is flowcharts showing operation in the rental system.
Figure 15:
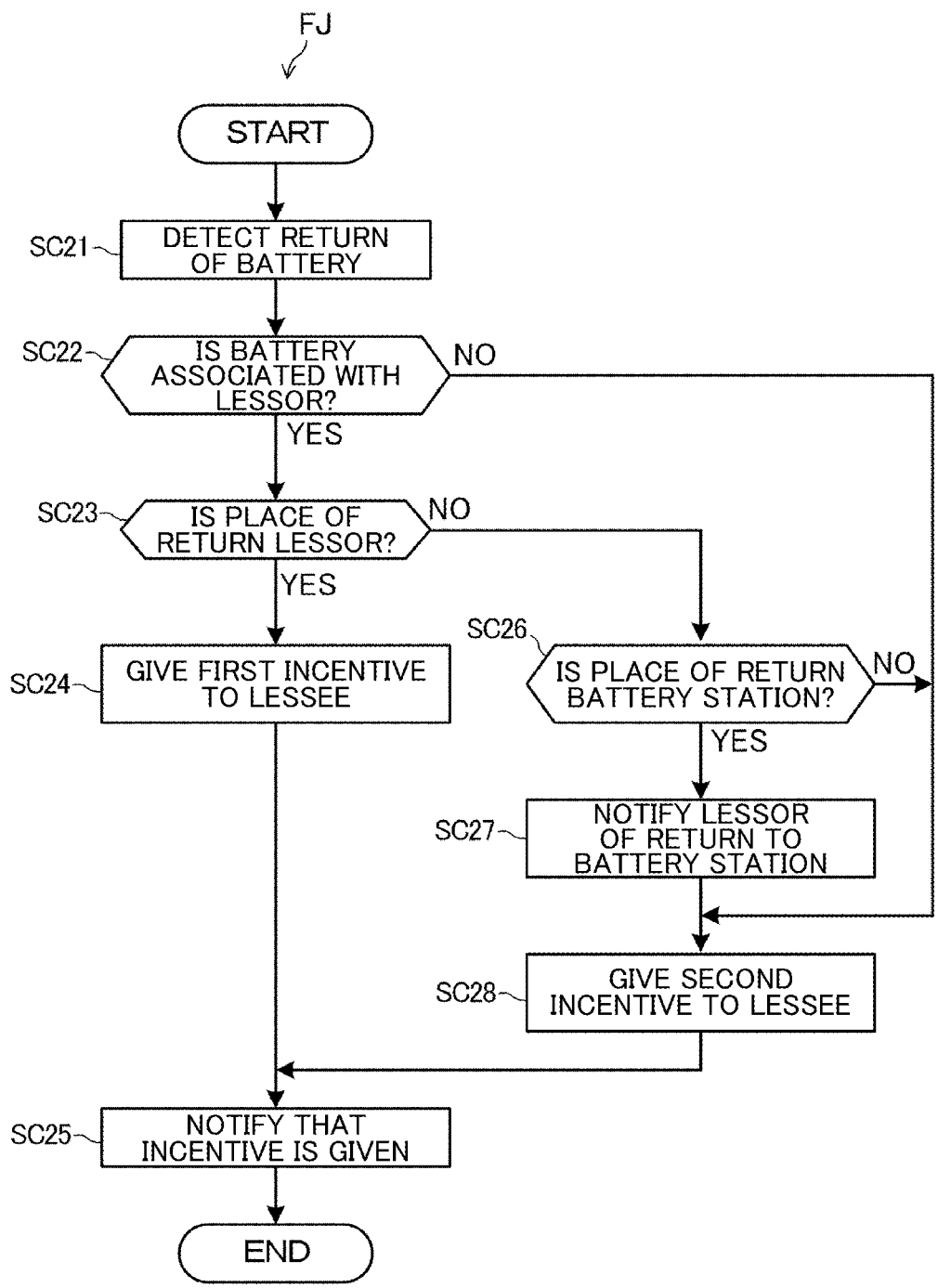
FIG. 15 is a flowchart showing operation in the rental system.

FIGS. 11, 14, and 15 are flowcharts showing operation in the rental system 1. With reference to these drawings, a description is given of a case where the user U2 rents a power pack 2 from the user U1, as an example. In the example, the user U1 is a lessor, and the user U2 is a lessee.

In FIG. 11, the flowchart FE shows operation of the management server 9, and the flowchart FF shows operation of the vehicle control device 60.

As shown in the flowchart FF, the vehicle control device 60 determines whether or not to search for a power pack 2 for rent (step SD1). For example, when the second reception section 605 receives, via the touch panel 630, an instruction to search for a power pack 2, the vehicle control device 60 makes positive determination in step SD1 (step SD1; YES).

When the vehicle control device 60 determines to search for a power pack 2 (step SD1; YES), the vehicle control device 60 generates search request information (step SD2).

In step SD2, the vehicle control device 60 acquires position information from the second location device 65. Then, the vehicle control device 60 generates the search request information including the acquired position information. Here, when the second reception section 605 receives an input of a destination from the user U2, the vehicle control device 60 adds information on the destination received by the second reception section 605 to the search request information to generate.

Subsequently, the vehicle control device 60 transmits the search request information to the management server 9 (step SD3).

As shown in the flowchart FE, the server reception section 901 receives the search request information (step SC1).

Subsequently, based on the search request information received in step SC1, the generation section 903 acquires an image of a map of the reference predetermined area from the map data 915 (step SC2). The reference predetermined area is a predetermined area based on a current position as a reference point. The current position is a position indicated by the position information in the search request information. The reference predetermined area is, for example, an area with a radius of 10 km centered on the reference point. The size of the area is predetermined.

Subsequently, the generation section 903 extracts, from the upload information management DB 914, upload information including battery information that meets a predetermined condition, of upload information including position information that indicates a position within the reference predetermined area. In the present embodiment, the battery state information that meets the predetermined condition is battery state information that meets a first predetermined condition or a second predetermined condition.

The battery state information that meets the first predetermined condition is battery state information indicating that the amount of charge in the power pack 2 is equal to or more than a predetermined amount (for example, 50% of an amount of charge when a full charge is reached).

The battery state information that meets the second predetermined condition is battery state information on a power pack 2 that is supplied with electricity from the in-vehicle battery 46 that has an amount of charge equal to or more than a predetermined amount, and is battery state information indicating that the power pack 2 is being charged.

The generation section 903 determines whether or not the battery state information under determination is battery state information that meets the predetermined condition, as follows. When the battery state information under determination indicates an amount of charge equal to or more than the predetermined amount, the generation section 903 determines that the battery state information under determination is battery state information that meets the first predetermined condition. When the battery state information under determination indicates that the battery pack 2 is being charged, and second battery information in the upload information that includes the battery state information under determination indicates an amount of charge equal to or more than the predetermined amount, the generation section 903 determines that the battery state information under determination is battery state information that meets the second predetermined condition.

The generation section 903 determines whether or not there is a power pack 2 associated with the lessee user U2, among the power packs 2 indicated by the extracted upload information (step SC4). In step SC4, the generation section 903 performs the determination, based on the ID of the power pack 2 included in each piece of the upload information extracted in step SC3, the ID of the lessee user U2, and information stored in the battery DB 918.

When there is a power pack 2 associated with the lessee user U2 (step SC4; YES), the generation section 903 generates a character image, based on growth information on a character and decoration information corresponding to the associated power pack 2 (step SC5). The generation section 903 generates a map image 102 that includes the generated character image (step SC6).

When there is no power pack 2 associated with the lessee user U2 (step SC4; NO), the generation section 903 generates a map image 102 that includes no character image (step SC6).

The map image 102 is a map image in which the battery information that meets the predetermined condition is displayed at a position on the map of the reference predetermined area corresponding to the current position of the second vehicle 6. The map image 102 is an image that is used in rental of a power pack 2 when the lessee user U2 seeks for rental of the power pack 2, and corresponds to an example of a rental map image in the present disclosure.

Figure 12:
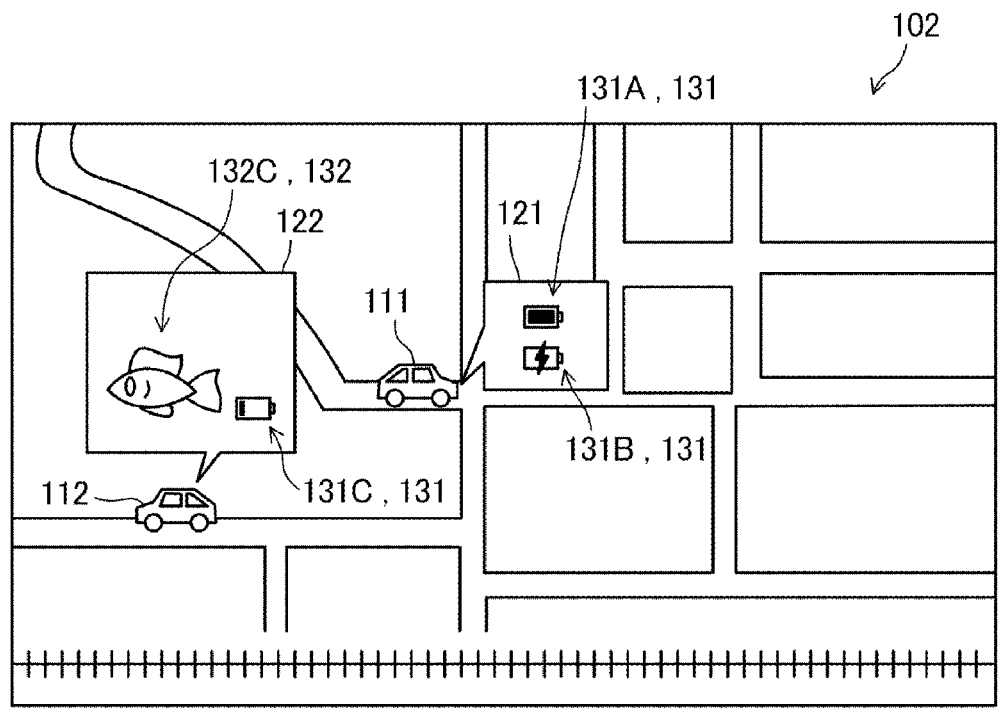
FIG. 12 shows an example of a map image.

FIG. 12 shows an example of the map image 102.

The map shown in the map image 102 is a map including at least part of the reference predetermined area. The map shown in the map image 102 may be a map of the entire reference predetermined area, centered on the current position of the second vehicle 6 that is the reference point. The map shown in the map image 102 may be an enlarged map of a range where a power pack 2 exits in the reference predetermined area, as shown in FIG. 12. FIG. 12 shows an image that is created and displayed when the user U2 is a lessee, in which case the user U2 corresponds to the second user. The same applies to a map image 103, which will be described later.

In the map image 102, battery information on each power pack 2 is displayed by using an icon or a letter. Specifically, in the map image 102, the information display portion 121 is placed in a manner of corresponding to a position of a power pack 2. In the present embodiment, a power pack 2 mounted in a vehicle is assumed to be a target of display. Accordingly, the vehicle image 111, which indicates a position of the first vehicle 4 in which power packs 2 are mounted, is placed in the map image 102 in FIG. 12. The information display portion 121 is placed at a position corresponding to the vehicle image 111, and battery information on the two power packs 2 mounted in the first vehicle 4 is displayed by using the battery icons 131A, 131B in the information display portion 121. As described above, the battery icon 131 indicates an amount of charge in and a charged state of a power pack 2. If a power pack 2 associated with the user U2 is mounted in the first vehicle 4, a character image is displayed in the information display portion 121.

In the map image 102 illustrated in FIG. 12, a vehicle image 112 indicating a position of the second vehicle 6 is displayed for the lessee user U2 to easily know the position. A battery icon 131C based on battery information on a power pack 2 mounted in the second vehicle 6 is displayed at a position corresponding to the vehicle image 112. The power pack 2 mounted in the second vehicle 6 is associated with the user U2. Accordingly, a character 132C is placed in an information display portion 122.

Figure 13:
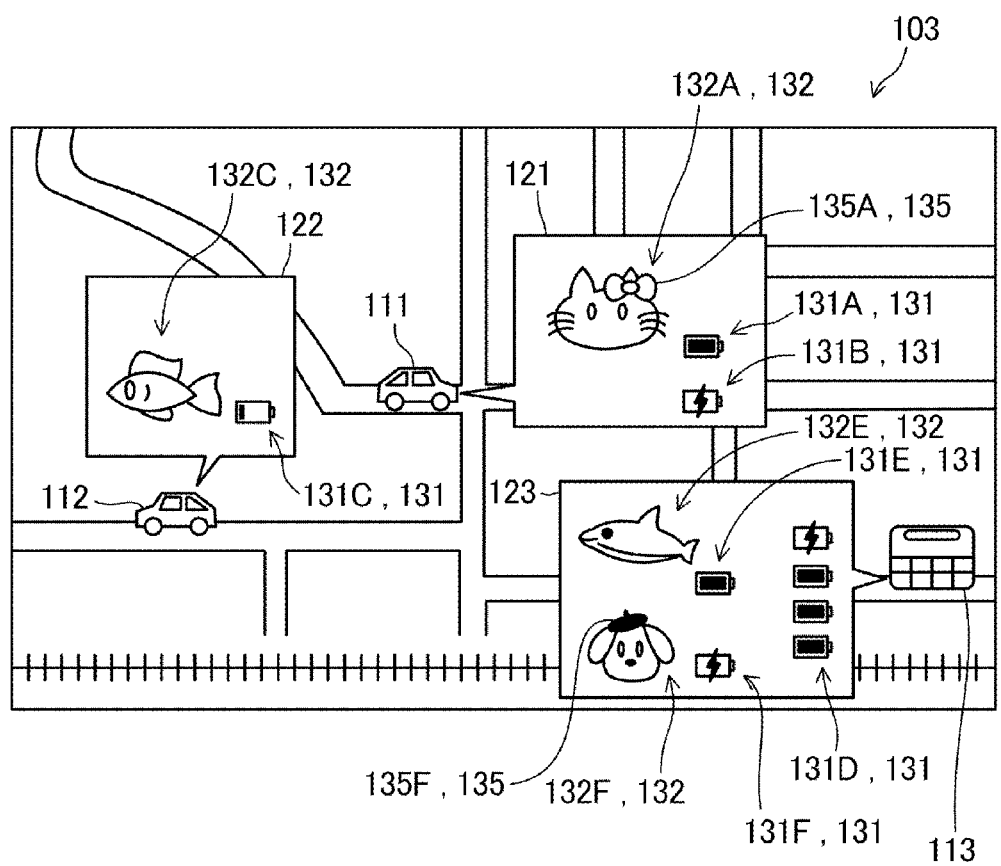
FIG. 13 shows another example of the map image.

FIG. 13 shows a map image 103, as another example of the map image. The map image 103 corresponds to an example of the rental map image.

The map image 103, similarly to the map image 102, is of a map including at least part of the reference predetermined area. In the map image 103, as in the map image 102, battery information on each power pack 2 is displayed by using an icon or a letter.

In the map image 103, as in the map image 102, the vehicle image 112 is displayed, corresponding to the second vehicle 6 used by the lessee user U2, and the information display portion 122 corresponding to the vehicle image 112 is placed. The character 132C associated with the user U2 is displayed in the information display portion 122. Moreover, in the map image 103, characters 132 are displayed with respect to power packs 2 mounted in vehicles used by other users U than the user U2.

Specifically, in the map image 103, the information display portion 121 is displayed in association with the vehicle image 111 representing the first vehicle 4. In the information display portion 121, the character 132A is displayed with respect to the power pack 2 associated with the user U1, among the power packs 2 mounted in the first vehicle 4. The character 132A is displayed with the addition of a decoration image 135A corresponding to a decoration applied by the user U1 to the power pack 2. The decoration image 135A is drawn based on decoration information stored in the battery DB 918 in association with the power pack 2. The decoration image 135A is an example of a decoration image 135.

A shape and a displayed form of the decoration image 135 are determined according to a type and a color of a decoration applied to a power pack 2. A shape and a displayed form of the decoration image 135A are predetermined in a manner of corresponding to a type and a color of each decoration applicable to the power pack 2, and corresponding to a type of the character 132 corresponding to the power pack 2. In other words, when a user U adds a decoration to a power pack 2 and decoration information related to the decoration is stored in the battery DB 918, a decoration image 135 corresponding to the type and the color of the decoration and corresponding to the type of the character 132 is displayed in the map image 102, 103.

In the map image 103, the battery icons 131A, 131B are displayed in the information display portion 121, with respect to the power pack 2 with which a character 132 is associated, and the power pack 2 with which a character 132 is not associated, respectively.

As described above, a character 132 associated with another user U than the user U2 may be displayed in the map image 103 that is generated in response to a request from the lessee user U2.

Moreover, in the map image 103, a station image 113 representing the battery station 8 is placed, and, in association with the station image 113, an information display portion 123 is displayed in which information related to power packs 2 accommodated in the battery station 8 is displayed.

A battery icon 131 indicating a charged state of each power pack 2 accommodated in the battery station 8 is displayed in the information display portion 123. Moreover, a character 132 corresponding to a power pack 2 accommodated in the battery station 8 is displayed in the information display portion 123. In other words, in the information display portion 123, a character 132 is displayed with respect to a power pack 2 that is associated with any one user U and for which the character 132 is set, among the power packs 2 accommodated in the battery station 8.

In the example in FIG. 13, six power packs 2 are accommodated in the battery station 8, and a character 132 is not set for four of the six power packs 2. Accordingly, battery icons 131D indicating respective charged states of the four power packs 2 are displayed in the information display portion 123.

The other two power packs 2 accommodated in the battery station 8 are associated with any users U, respectively, and characters 132 are set, respectively, based on information in the battery DB 918. Correspondingly, battery icons 131E, 131F indicating respective charged states of the power packs 2, and characters 132E, 132F representing the power packs 2 are displayed in the information display portion 123. A decoration image 135F corresponding to a decoration applied by the user U to the power pack 2 is added to the character 132F. The characters 132E, 132F are displayed in the map image 103, in forms corresponding to growth information stored in the battery DB 918.

As described above, among power packs 2 located within a predetermined range from the second vehicle 6 of the lessee user U2, power packs 2 that are present in vehicles and the battery station 8 may be displayed in the map image 103 created by the management server 9.

In the example shown in FIG. 12, the character 132C, which is associated with the power pack 2 that is the first battery associated in the past with the lessee user U2, is displayed in the map image 102 that is an example of the rental map image. Here, when a decoration is added to the power pack 2 of interest, a decoration related to the character 132 is displayed. Such a display method can allow the user U2 to immediately spot and understand the power pack 2 relevant to the user U2 from the map image 102, and can make the user U2 feel a connection between the specific power pack 2 and the user. The same holds true both when the user U2 is a lessee and when the user U2 is a lessor, and the same also applies to the users U1, U3.

In the example shown in FIG. 13, characters 132 associated with power packs 2 are displayed in the map image 103 that is a rental map image, with respect to the power pack 2 associated with the user U2, and also the different power packs 2 from the power pack 2 associated with the user U2. Such a display method can provide users U with a way for fun, in which a user U purposively collects characters 132 by associating a desired character 132 with a power pack 2. Moreover, there are some cases where a user U realize a connection between another user U who is different from the user U and a specific power pack 2 by visually perceiving a character 132 of the power pack 2 associated with the other user U, so that development of a community of users U related to rental of power packs 2 can be promoted.

Further, in the map image 103, not only a character 132 related to a power pack 2 mounted in a vehicle is drawn, but a character 132 related to a power pack 2 accommodated in the battery station 8 is also drawn. Thus, by associating a character 132 with a power pack 2, the management server 9 can provide users U with a new way for fun incidental to rental and use of power packs 2.

Returning to the description of FIG. 11, the server transmission section 902 transmits image data on the map image 102 generated in step SC6 to the second vehicle 6 (step SC7). Here, the server transmission section 902 corresponds to an example of an image transmission section.

As shown in the flowchart FF, the vehicle control device 60 receives the image data on the map image 102 (step SD4). The second display control section 604 causes the touch panel 630 to display the map image 102 corresponding to the image data received in step SD4 (step SD5). In display of the map image 102, the second display control section 604, for example, causes the battery icons 131 in the information display portion 121 placed in the map image 102 to be displayed in a selectable manner.

FIG. 14 shows operation when the user U2 requests rental of a power pack 2, based on the map image 102. The map image 102 is already displayed on the touch panel 630 when the operation in FIG. 14 is started.

In FIG. 14, a flowchart FG shows operation of the vehicle control device 60, a flowchart FH shows operation of the management server 9, and a flowchart FI shows operation of the vehicle control device 40.

As shown in the flowchart FG, the vehicle control device 60 receives, by using the second reception section 605, an operation made by the user U2, and transmits a rental request for a power pack 2 (step SD11). The rental request transmitted in step SD11 requests a power pack 2 mounted in the first vehicle 4 to be rented out.

As shown in the flowchart FH, the server reception section 901 receives the rental request transmitted from the second vehicle 6 (step SC11). Based on the rental request from the second vehicle 6, the server transmission section 902 transmits a request for rental of a power pack 2 to the vehicle control device 40 (step SC12).

As shown in the flowchart FI, the first communication control section 401 receives the request for rental transmitted from the management server 9 (step SE1). The first display control section 404 causes the touch panel 430 to display details of the request received in step SE1 (step SE2). Here, the first communication control section 401 receives, by using the first reception section 405, an operation made on the touch panel 730 (step SE3). Specifically, the operation is an operation to accept, or an operation to reject, the request displayed in step SE2. The first communication control section 401 transmits a result of the operation received by the first reception section 405 to the management server 9 (step SE4).

As shown in the flowchart FH, the server reception section 901 receives the result of the operation transmitted from the first vehicle 4 (step SC13). Based on the result received from the first vehicle 4, the server reception section 901 updates the rental history DB 916 (step SC14). For example, when the first reception section 405 receives the operation for acceptance, rental of a power pack 2 is agreed on. In such a case, the server reception section 901 generates a record related to the new rental, stores the record in the rental history DB 916, and thus updates the rental history DB 916. For example, when the first reception section 405 receives the operation for rejection, rental of a power pack 2 is not agreed on. In such a case, the server reception section 901 may update the rental history DB 916 by generating information indicating that the new rental is not agreed on, or may skip step SC14.

The server transmission section 902 transmits the result received from the first vehicle 4 in step SC13 to the second vehicle 6 (step SC15).

The incentive management section 905 gives an incentive to the lessor based on the result received from the first vehicle 4, and updates the incentive DB 917 (step SC16). For example, when rental of a power pack 2 is agreed on, the server reception section 901 updates information corresponding to the ID of the lessor in the incentive DB 917 such that an incentive related to the new rental is given to the lessor. When rental of a power pack 2 is not agreed on, the management server 9 may skip step SC16.

The third communication control section 601 receives the result transmitted from the management server 9 (step SD12). The second display control section 604 displays the result received in step SD12 on the touch panel 630 (step SD13).

FIG. 15 shows operation when a power pack 2 is returned. A flowchart FJ shows operation of the management server 9.

The server reception section 901 detects that a power pack 2 is returned (step SC21). In the rental system 1, when a lessee of a power pack 2 returns the power pack 2, the lessee can transmit, to the management server 9, a notification of the return by operating the vehicle control device 40, 60, 70, or the like. Moreover, when a power pack 2 is returned, a lessor of the power pack 2 can transmit, to the management server 9, a notification of the power pack 2 being returned. Such notifications include, for example, the ID of a user U using a vehicle to which the power pack 2 is returned, and the ID of the power pack 2. Further, when the battery station 8 accommodates a new power pack 2, the battery station 8 notifies the ID of the accommodated power pack 2 to the management server 9. The server reception section 901 performs step SC21 when any of such notifications is received.

Based on information stored in the rental history DB 916, the incentive management section 905 determines whether or not the returned power pack 2 is a power pack 2 associated with the lessor user U (step SC22). When it is determined that the returned power pack 2 is not a power pack 2 associated with the lessor user U (step SC22; NO), the incentive management section 905 moves to step SC28, which will be described later. The case where a negative determination is made in step SC22 corresponds to a case where the user U2 returns the second power pack 2B that is not associated with the user U1.

When the returned power pack 2 is a power pack 2 associated with the lessor user U (step SC22; YES), the incentive management section 905 determines whether or not the place to which the power pack 2 is returned is the lessor (step SC23).

When the place of return is the lessor (step SC23; YES), the incentive management section 905 gives a first incentive to the lessee who has returned the power pack 2 (step SC24). Specifically, the incentive management section 905 updates information stored in the incentive DB 917 in association with the ID of the lessee user U by adding the first incentive. The case where a positive determination is made in step SC23 corresponds to a case where the user U2 returns the first power pack 2A associated with the user U1 to the user U1.

The incentive management section 905 transmits notification of the incentive being given, to the vehicle control device 40, 60, 70, or the like that is a terminal operated by the lessee (step SC25).

When it is determined that the place to which the power pack 2 is returned is not the lessor (step SC23; NO), the incentive management section 905 determines whether or not the place of return is the battery station 8 (step SC26). Here, when the place of return is not the battery station 8 (step S26; NO), the incentive management section 905 moves to step SC28, which will be described later. The case where a negative determination is made in step SC23 corresponds to a case where the user U2 returns the first power pack 2A associated with the user U1 to the place of return that is different from the user U1.

When the place of return is the battery station 8 (step SC26; YES), the return notification section 907 notifies the vehicle control device 40, 60, 70, or the like that is a terminal operated by the lessor of the power pack 2 that the power pack 2 is returned to the battery station 8 (step SC27). Thereafter, the incentive management section 905 gives a second incentive to the lessee who has returned the power pack 2 (step SC28). Specifically, the incentive management section 905 updates information stored in the incentive DB 917 in association with the ID of the lessee user U, by adding the second incentive.

The first incentive and the second incentive are ratings or considerations given to a lessee of a power pack 2 for return of the power pack 2. The first incentive is an incentive with a higher value than that of the second incentive. Specifically, the first incentive is a larger amount of money than the second incentive. Alternatively, the first incentive is an incentive that can be converted into a higher value in monetary terms than the second incentive. Alternatively, an indicator indicating the value of the first incentive indicates a higher value than an indicator indicating the value of the second incentive.

A lessee of a power pack 2 may return the power pack 2 to the lessor of the power pack 2, or to the battery station 8, and there is no restriction related to a place of return. Accordingly, convenience of a lessee who temporarily uses a power pack 2 can be enhanced. Moreover, a lessee of a power pack 2 can gain an incentive with a higher value when returning the power pack 2 to the lessor, than when returning the power pack 2 to the battery station 8. Accordingly, return of a power pack 2 to a lessor can be encouraged, without impairing convenience of a lessee user U. Thus, since the probability increases that a power pack 2 is returned to a lessor user U, a tendency for the user U to continue using the same power pack 2 can be promoted. Continuous use of a specific power pack 2 by a user U brings the advantage that psychological benefits can be expected, such as the user U having confidence in the state of the power pack 2, and the user U developing affection for the power pack 2.

In addition, in the rental system 1, a character can be set for a power pack 2 associated with a user U, and it can be shown to the user U how the character grows with use of the power pack 2. Thus, affection of the user U for the power pack 2 can be fostered, and the user U can be encouraged to continue using the rental system 1.

Figure 16:
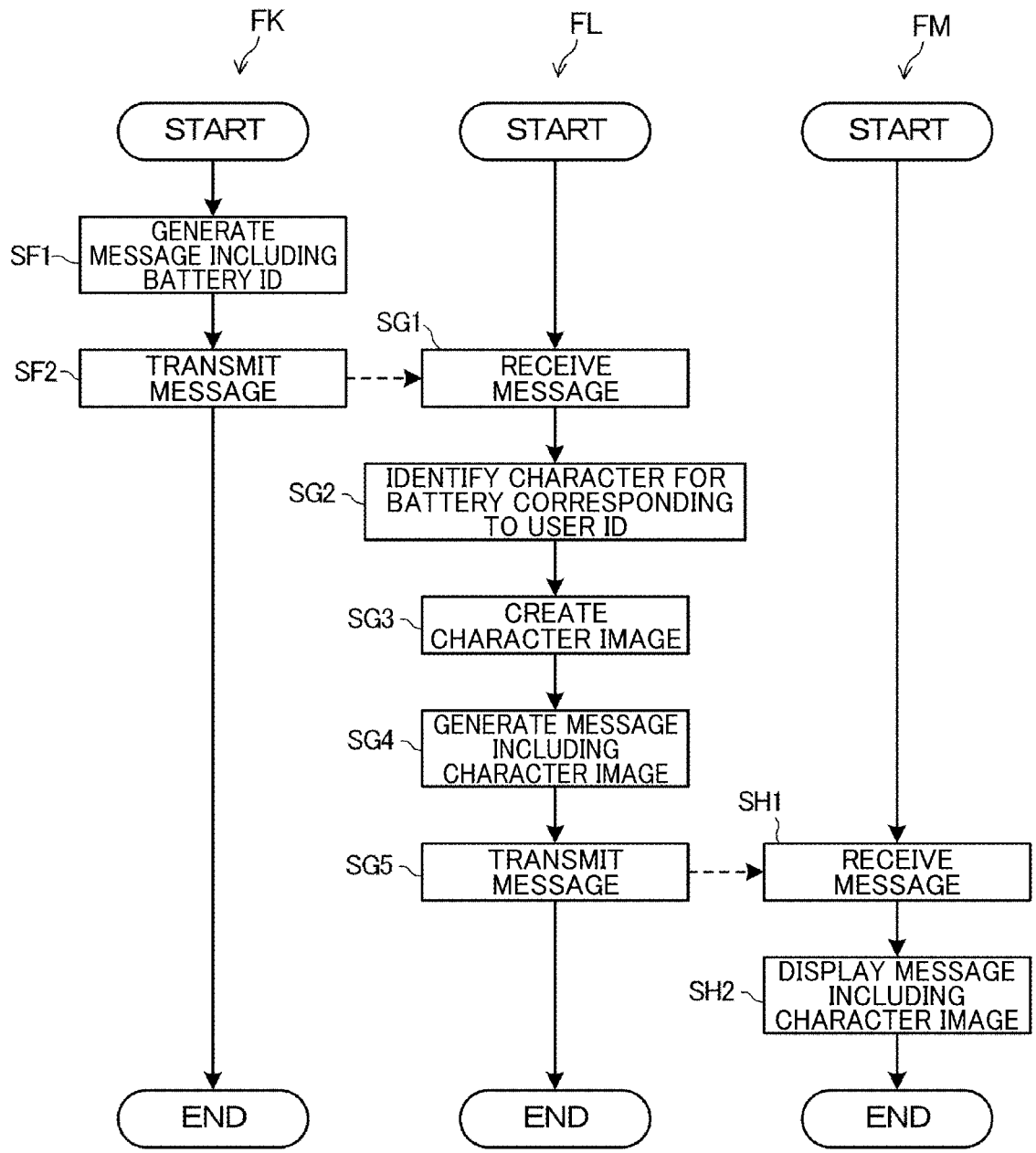
FIG. 16 is flowcharts showing operation in the rental system.

FIG. 16 is flowcharts showing operation in the rental system 1, and shows operation of transmitting and receiving messages between the first vehicle 4, the second vehicle 6, and the third vehicle 7 included in the rental system 1. The flowchart FK shows operation of a terminal that transmits a message, and the flowchart FL shows operation of the management server 9. The flowchart FM shows operation of a terminal that receives a message. As an example, a description is given of operation in which the first vehicle 4 transmits a message to the third vehicle 7. In the example, the flowchart FK corresponds to operation of the vehicle control device 40, and the flowchart FM corresponds to operation of the vehicle control device 70.

As shown in the flowchart FK, the message generation section 408 generates a message including a letter and a sign, in accordance with an operation on the touch panel 430 received by the first reception section 405 (step SF1). The message generation section 408 transmits, by using the first communication device 41, the generated message to the management server 9 (step SF2). Here, the first communication device 41 corresponds to an example of a message transmission section.

The server reception section 901 receives the message transmitted from the first vehicle 4 (step SG1). The message processing section 906 identifies a character for a power pack 2 corresponding to the ID of a user U who is the source of the received message (step SG2). In step SG2, the message processing section 906 acquires the ID of the user U who is the source of the message, from the message. The message processing section 906 acquires information corresponding to the ID of the user U in the battery DB 918, and identifies the power pack 2 associated with the ID of the user U. The message processing section 906 acquires the character for the identified power pack 2, growth information, and decoration information.

The message processing section 906 creates a character image of the character identified in step SG2, based on information in the battery DB 918 (step SG3). The message processing section 906 generates a message including the created character image (step SG4), and transmits the generated message to the third vehicle 7 (step SG5).

The fifth communication control section 701 receives the message transmitted from the management server 9 (step SH1). The third display control section 704 displays the received message, together with the character image, on the touch panel 730 (step SH2).

9. Other Embodiments

The above-described embodiment is only to illustrate one embodiment, and modifications and applications can be arbitrarily made.

In the above-described embodiment, an electrified four-wheeled automobile is illustrated as a mobile object in the present disclosure. However, the mobile object in the present disclosure is not limited to the electrified four-wheeled automobile, and may be any object that moves, through operation of a lessor, on land, in the air, at sea, or under water. Example of such an object include a vehicle, a flight vehicle, a boat, a ship, and the like.

Each of the processors 400, 600, 700, 800, 900 may include a plurality of processors, or may include a single processor. Each of the processors 400, 600, 700, 800, 900 may be hardware programed to implement functionality of each of sections, which are described below. In such a case, each of the processors 400, 600, 700, 800, 900 is configured by using, for example, an ASIC (application specific integrated circuit) or an FPGA (field programmable gate array).

Each section or part of each device included in the rental system 1 shown in FIGS. 2 to 7 is an example, and a specific form for implementation is not limited. In other words, hardware pieces respectively corresponding to the individual sections and parts do not need to be installed, and a configuration is obviously possible in which the functionality of each section and each part is implemented by a single processor executing a program. Moreover, one or some of the functions implemented by using software in the above-described embodiment may be configured as hardware, or one or some of the functions implemented by using hardware may be implemented by using software. In addition, a specific detailed configuration of each of the other sections and parts of each device included in the rental system 1 can also be arbitrarily changed without departing from the gist of the present invention.

Moreover, the step units of operation shown in FIGS. 8, 10, 11, and 14 to 16 are divisions based on main processing contents, and the present invention is not limited by a method of division for and names of processing units. Division may be made to have even more step units, depending on processing contents. Division may be made such that one step unit includes even more processes. Order of the steps can be changed as appropriate, without harming the gist of the present invention.

10. Configurations Supported by the Above-Described Embodiment

The above-described embodiment supports the following configurations.

(Configuration 1) A management system including: a plurality of portable batteries including a first battery and a second battery, the first battery being associated with a first user, the second battery being not associated with the first user; a management server that manages information related to use of the batteries; a first user terminal used by the first user; and a second user terminal used by a second user, wherein the management server includes a reception section that receives, from the second user terminal, a rental request for use of the first battery or the second battery, and an incentive management section that, when the first battery or the second battery is rented to the second user, gives an incentive to the second user, according to return of the first battery or the second battery from the second user, the incentive management section gives a first incentive to the second user when the second user returns the first battery to the first user, and gives a second incentive to the second user when the second user returns the second battery to the first user or when the second user returns the first battery to a place of return that is different from the first user, and the first incentive is an incentive having a higher value than the second incentive.

According to the management system of configuration 1, a battery can be easily rented between the first user and the second user. According to the configuration, the second user who uses the first battery associated with the first user can be encouraged to return the first battery to the first user, by using an incentive. Thus, a state can be realized where the first user easily uses the first battery with a high frequency or for a long time, without limiting a place of return to which the second user returns the first battery. Accordingly, a user is made to feel a connection between a specific battery and the user, so that the user can be expected to foster confidence in or affection for the battery.

(Configuration 2) The management system according to configuration 1, further including a return notification section that sends a return notification to the first user terminal when the first battery is rented to the second user and when the second user returns the first battery to a battery accommodation device that is capable of accommodating any of the batteries.

According to the management system of configuration 2, when the first battery is returned to the battery accommodation device, it is made easy for the first user to collect the first battery from the battery accommodation device. Thus, a user is made to more strongly feel a connection between a specific battery and the user, so that the user can foster confidence in or affection for the battery.

(Configuration 3) The management system according to configuration 1 or 2, wherein the management server includes a character growth information storage section that stores a character state and character growth information in association with battery identification information for identification of each of the batteries including the first battery and the second battery, the character state indicating a character, the character growth information indicating a growth state of the character, a character growth management section that updates the character growth information associated with the battery identification information on the first battery, according to a history of use of the first battery by the first user, and a character image transmission section that transmits, to the first user terminal, a character image for display of the character in a growth state based on the character growth information.

According to the management system of configuration 3, it can be shown to a user how a character corresponding to a battery grows. Thus, by using a character, a user is made to more strongly feel a connection between a specific battery and the user, so that the user can foster confidence in or affection for the battery.

(Configuration 4) The management system according to configuration 3, wherein the first battery and the second battery are mountable in a first mobile object used by the first user, and the character growth management section updates the character growth information, according to a travel distance traveled by the first mobile object in a state where the first battery is mounted in the first mobile object, and according to a history of use of electricity in the first battery by the first mobile object.

According to the management system of configuration 4, a growth state of a character can be changed according to use of a battery in a mobile object. Thus, by using a character, a user is made to more strongly feel a connection between a specific battery and the user, so that the user can foster confidence in or affection for the battery.

(Configuration 5) The management system according to configuration 4, wherein the first user terminal is a device mounted in the first mobile object, and includes a display section that displays the character, based on the character image.

According to the management system of configuration 5, by using a device mounted in a mobile object, a battery mounted in the mobile object can be shown as a character to a user. Thus, by using a character, a user is made to more strongly feel a connection between a specific battery and the user, so that the user can foster confidence in or affection for the battery.

(Configuration 6) The management system according to any one of configurations 3 to 5, wherein it is possible to decorate the first battery with a decoration, the first user terminal includes a decoration state acquisition section that acquires a decoration state of the first battery, and a battery decoration notification section that notifies the decoration state of the first battery to the management server, the management server includes a battery decoration state storage section that, when the decoration state of the first battery is notified from the first user terminal, stores the decoration state of the first battery in association with the battery identification information on the first battery, and the character image transmission section transmits, to the first user terminal, the character image for display of the character in the growth state based on the character growth information, the character image reflecting the decoration state of the first battery.

According to the management system of configuration 6, a character image can be changed in a manner of corresponding to a decoration state of a battery. Thus, an act of a user to decorate a battery can be associated with a character image. Accordingly, by using a character, a user is made to more strongly feel a connection between a specific battery and the user, so that the user can foster confidence in or affection for the battery.

(Configuration 7) The management system according to any one of configurations 3 to 6, wherein the management server includes a generation section that generates image data on a rental map image in which any of the batteries that is a possible target of the rental request from the first user is placed on a map including a position of the first user, and an image transmission section that transmits the image data to the first user terminal, and when any of the batteries that is a possible target of the rental request from the first user includes the first battery, the rental map image displays the character associated with the first battery in the growth state based on the character growth information.

According to the management system of configuration 7, when a user seeks for rental of a battery, the user can easily search for a battery by using an image including a map, so that user convenience can be enhanced. Moreover, a character corresponding to a battery is displayed in the image used to search for a battery, whereby an enjoyable aspect can be enhanced in use of the system.

(Configuration 8) The management system according to any one of configurations 3 to 7, wherein the first user terminal includes a message transmission section that transmits, to the management server, a message addressed to the second user terminal, and the management server includes a message processing section that, when the message is received from the first user terminal, transmits, to the second user terminal, the message and display data for display of the character associated with the first battery.

According to the management system of configuration 8, a character image can be added to a message transmitted and received between users. Thus, by using a character, a user is made to more strongly feel a connection between a specific battery and the user, so that the user can foster confidence in or affection for the battery.

(Configuration 9) A management method for managing information related to use of a plurality of batteries including a first battery and a second battery, the first battery being associated with a first user, the second battery being not associated with the first user, the management method including: by a management server, a reception step of receiving, from a second user terminal used by a second user, a rental request for use of the first battery or the second battery; and an incentive giving step of, when the first battery or the second battery is rented to the second user, giving an incentive to the second user, according to return of the first battery or the second battery from the second user, wherein in the incentive giving step, when the second user returns the first battery to the first user, a first incentive is given to the second user, and when the second user returns the second battery to the first user or when the second user returns the first battery to a place of return that is different from the first user, a second incentive is given to the second user, and the first incentive is an incentive having a higher value than the second incentive.

According to the management method of configuration 9, as similarly to the management system of configuration 1, a user is made to feel a connection between a specific battery and the user. Thus, the user can be expected to foster confidence in or affection for the battery.

(Configuration 10) A management server that manages information related to use of a plurality of portable batteries including a first battery and a second battery, the first battery being associated with a first user, the second battery being not associated with the first user, the management server including: a reception section that receives, from a second user terminal used by a second user, a rental request for use of the first battery or the second battery; and an incentive management section that, when the first battery or the second battery is rented to the second user, gives an incentive to the second user, according to return of the first battery or the second battery from the second user, wherein the incentive management section gives a first incentive to the second user when the second user returns the first battery to the first user, and gives a second incentive to the second user when the second user returns the second battery to the first user or when the second user returns the first battery to a place of return that is different from the first user, and the first incentive is an incentive having a higher value than the second incentive.

According to the management server of configuration 10, similarly to the management system of configuration 1, a user is made to feel a connection between a specific battery and the user. Thus, the user can be expected to foster confidence in or affection for the battery.

(Configuration 11) A program executable by a computer that manages information related to use of a plurality of portable batteries including a first battery and a second battery, the first battery being associated with a first user, the second battery being not associated with the first user, the program causing the computer to function as: a reception section that receives, from a second user terminal used by a second user, a rental request for use of the first battery or the second battery; and an incentive management section that, when the first battery or the second battery is rented to the second user, gives an incentive to the second user, according to return of the first battery or the second battery from the second user, wherein the incentive management section gives a first incentive to the second user when the second user returns the first battery to the first user, and gives a second incentive to the second user when the second user returns the second battery to the first user or when the second user returns the first battery to a place of return that is different from the first user, and the first incentive is an incentive having a higher value than the second incentive.

According to the program of configuration 10, similarly to the management system of configuration 1, a user is made to feel a connection between a specific battery and the user. Thus, the user can be expected to foster confidence in or affection for the battery.

REFERENCE SIGNS LIST 1 rental system (management system), 2 power pack (battery), 2A first power pack (first battery), 2B second power pack (second battery), 4 first vehicle (first mobile object), 6 second vehicle, 7 third vehicle, 8 battery station (battery accommodation device), 9 management server, 40 vehicle control device (first user terminal), 41 first communication device (message transmission section), 42 second communication device, 44 charge station, 45 first location device, 60 vehicle control device (second user terminal), 64 charge station, 70 vehicle control device, 74 charge station, 76 in-vehicle battery, 81 seventh communication device, 82 eighth communication device, 84 charge station, 90 server control device, 91 server communication device, 101 character image, 102 map image (rental map image), 400, 600, 700, 800, 900 processor, 401 first communication control section, 402 second communication control section, 403 instruction section, 404 first display control section, 405 first reception section, 406 decoration state acquisition section, 407 battery decoration notification section, 408 message generation section, 430 touch panel (display section), 901 server reception section, 902 server transmission section (character display information transmission section, image transmission section), 903 generation section, 904 search section, 905 incentive management section, 906 message processing section, 907 return notification section, 911 control program (program), 912 lessor management DB, 913 lessee management DB, 914 upload information management DB, 915 map data, 916 rental history DB, 917 incentive DB, 918 battery DB (character growth information storage section, battery decoration state storage section).

What is claimed is:
1. A management system comprising:
a plurality of portable batteries including a first battery and a second battery, the first battery being associated with a first user, the second battery being not associated with the first user;
a plurality of vehicles including a first vehicle operated by the first user, and a second vehicle operated by the second user, wherein each vehicle in the plurality of vehicles is configured to hold, charge, and discharge a portable battery from the plurality of portable batteries;
a management server that manages information related to use of the batteries;
a first vehicle control device included in the first vehicle as a first user terminal used by the first user; and
a second vehicle control device included in the second vehicle as a second user terminal used by a second user, wherein
the second vehicle control device is configured to communicate battery information to the management server from a portable battery held by the second vehicle, and the management server comprises a management server processor that:

communicates with the first user terminal and the second user terminal via a communication network, receives, from the second user terminal, a rental request for use of the first battery or the second battery, gives an incentive to the second user when at least one of the first battery and the second battery is rented to the second user, according to return of the at least one of the first battery and the second battery from the second user, and based on battery information collected by the second vehicle control device, gives a first incentive to the second user when the second user returns the first battery to the first user, and gives a second incentive to the second user when the second user returns the second battery to the first user or when the second user returns the first battery to a place of return that is different from the first user, the first incentive having a higher value than the second incentive.

2. The management system according to claim 1, wherein the management server processor sends a return notification to the first user terminal when the first battery is rented to the second user and when the second user returns the first battery to a battery accommodation device that is capable of accommodating any of the batteries.

3. The management system according to claim 1, wherein the management server includes a memory that stores a character state and character growth information in association with battery identification information for identification of each of the batteries including the first battery and the second battery, the character state indicating a character, the character growth information indicating a growth state of the character, the management server processor further includes, a character growth management section that updates the character growth information associated with the battery identification information on the first battery, according to a history of use of the first battery by the first user, and a character image transmission section that transmits, to the first user terminal, a character image for display of the character in a growth state based on the character growth information.

4. The management system according to claim 3, wherein the character growth management section updates the character growth information, according to a travel distance traveled by the first vehicle in a state where the first battery is mounted in the first vehicle, and according to a history of use of electricity in the first battery by the first vehicle.

5. The management system according to claim 4, wherein the first user terminal includes a display section that displays the character, based on the character image.

6. The management system according to claim 3, wherein it is possible to decorate the first battery with a decoration, the first user terminal comprises a first user terminal processor, the first user terminal processor acquires a decoration state of the first battery, and a battery decoration notification section that notifies the decoration state of the first battery to the management server, the memory of the management server, when the decoration state of the first battery is notified from the first user terminal, stores the decoration state of the first battery in association with the battery identification information on the first battery, and the character image transmission section transmits, to the first user terminal, the character image for display of the character in the growth state based on the character growth information, the character image reflecting the decoration state of the first battery.

7. The management system according to claim 3, wherein the management server processor further generates image data on a rental map image in which any of the batteries that is a possible target of the rental request from the first user is placed on a map including a position of the first user, and transmits the image data to the first user terminal, and when any of the batteries that is a possible target of the rental request from the first user includes the first battery, the rental map image displays the character associated with the first battery in the growth state based on the character growth information.

8. The management system according to claim 3, wherein

The first user terminal processor further transmits, to the management server, a message addressed to the second user terminal, and the management server processor further, when the message is received from the first user terminal, transmits, to the second user terminal, the message and display data for display of the character associated with the first battery.

9. The system of claim 1, wherein the battery information from the second vehicle control device indicates an amount of charge in the battery rented by the second user, and the management server gives the incentive to the second user based on the amount of charge indicated by the battery information.

10. The system of claim 9, wherein the second vehicle is configured to hold multiple batteries, and the second vehicle control device is configured to cause the second vehicle to charge the at least one of the first battery and the second battery using at least one of an external power supply and another battery held by the second vehicle.

11. A management method for managing information related to use of a plurality of batteries including a first battery and a second battery, the first battery being associated with a first user, the second battery being not associated with the first user, wherein the plurality of batteries are used by a plurality of vehicles including a first vehicle operated by the first user, and a second vehicle operated by a second user, and each vehicle in the plurality of vehicles is configured to hold, charge, and discharge a battery from the plurality of portable batteries, the management method comprising:

by a management server, a reception step of receiving, from a second vehicle control device included in the second vehicle as a second user terminal used by a second user, a rental request for use of the first battery or the second battery; and an incentive giving step of, giving an incentive to the second user when at least one of the first battery and the second battery is rented to the second user, according to return of the at least one of the first battery and the second battery from the second user, and based on battery information collected by the second vehicle control device from a battery held by the second vehicle, wherein the management server communicates with the second user terminal via a communication network, in the incentive giving step, a first incentive is given to the second user when the second user returns the first battery to the first user, and a second incentive is given to the second user when the second user returns the second battery to the first user or when the second user returns the first battery to a place of return that is different from the first user, and the first incentive has a higher value than the second incentive.

12. A management server that manages information related to use of a plurality of portable batteries including a first battery and a second battery, the first battery being associated with a first user, the second battery being not associated with the first user, wherein the plurality of batteries are used by a plurality of vehicles including a first vehicle operated by the first user, and a second vehicle operated by a second user, and each vehicle in the plurality of vehicles is configured to hold, charge, and discharge a battery from the plurality of portable batteries, the management server comprising a server processor that:

receives, from a second vehicle control device included in the second vehicle as a second user terminal used by a second user, a rental request for use of at least one of the first battery and the second battery; and gives an incentive to the second user when the first battery or the second battery is rented to the second user, according to return of the at least one of the first battery and the second battery from the second user, wherein the management server communicates with the second user terminal via a communication network, the server processor gives a first incentive to the second user when the second user returns the first battery to the first user, and gives a second incentive to the second user when the second user returns the second battery to the first user or when the second user returns the first battery to a place of return that is different from the first user, and the first incentive has a higher value than the second incentive.

13. A non-transitory computer-readable storage medium storing a program executable by a computer that manages information related to use of a plurality of portable batteries including a first battery and a second battery, the first battery being associated with a first user, the second battery being not associated with the first user, wherein the plurality of batteries are used by a plurality of vehicles including a first vehicle operated by the first user, and a second vehicle operated by a second user, and each vehicle in the plurality of vehicles is configured to hold, charge, and discharge a battery from the plurality of portable batteries, the program causing the computer to:

receive, from a second vehicle control device included in the second vehicle as a second user terminal used by a second user, a rental request for use of at least one of the first battery and the second battery; and give an incentive to the second user when the first battery or the second battery is rented to the second user, according to return of the at least one of the first battery and the second battery from the second user, wherein the computer communicates with the second user terminal via a communication network, the computer gives a first incentive to the second user when the second user returns the first battery to the first user, and gives a second incentive to the second user when the second user returns the second battery to the first user or when the second user returns the first battery to a place of return that is different from the first user, and the first incentive has a higher value than the second incentive.

* * * * *